US006202070B1

(12) United States Patent
Nguyen et al.

(10) Patent No.: US 6,202,070 B1
(45) Date of Patent: Mar. 13, 2001

(54) COMPUTER MANUFACTURING SYSTEM ARCHITECTURE WITH ENHANCED SOFTWARE DISTRIBUTION FUNCTIONS

(75) Inventors: Chau-Lang N. Nguyen, Spring; Gunnar P. Seaburg, The Woodlands; Andrew Ta, Houston; Anthony Ty Marler, Weatherford; Richard Andrewski, Houston; Lee Preimesberger, Houston; James Young, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/002,152

(22) Filed: Dec. 31, 1997

(Under 37 CFR 1.47)

(51) Int. Cl.[7] ........................................... G06F 9/00
(52) U.S. Cl. ............................................ 707/104; 707/10
(58) Field of Search ........................................ 707/1–206

(56) References Cited

U.S. PATENT DOCUMENTS 5,778,395 * 7/1998 Whiting et al. ...................... 707/204
5,805,897 * 9/1998 Gloway ................................ 395/712

* cited by examiner

Primary Examiner—Thomas G. Black
Assistant Examiner—John G. Mills
(74) Attorney, Agent, or Firm—Robert Groover

(57) ABSTRACT

The present application discloses a system of software distribution in computer manufacturing which manages and distributes software from release by a software engineering group to installation at a remote manufacturing site or testing facility. The distribution system disclosed seeks to overcome the deficiencies of present software distribution systems. In overcoming these deficiencies, the distribution system disclosed contains several innovative features.

4 Claims, 18 Drawing Sheets

COMPUTER MANUFACTURING SYSTEM ARCHITECTURE WITH ENHANCED SOFTWARE DISTRIBUTION FUNCTIONS

BACKGROUND AND SUMMARY OF THE INVENTION

The present application relates to computer manufacturing, and particularly to distribution of software releases to be installed at remote computer manufacturing or test facilities.

Background: Software Installation

Software installation is normally a burden with new computers, and is often a source of frustration for consumers. Thus, pre-installation of software by the computer manufacturer is very welcome to consumers. Pre-installation also helps to avoid problems which might be caused by software incompatibilities or incorrect installation of software. Pre-installation of software also helps to avoid unnecessary service calls to the computer manufacturer which may be due to the consumer's difficulty in understanding the software installation instructions.

Software Management

Pre-installation of software to prevent incompatibilities or incorrect installation at the consumer level requires careful software management. This management takes place not only prior to but also during the manufacturing process.

Traditionally, pre-installation is accomplished through creation of disk images. A disk image is a file that holds a copy of all of the data, including partitioning and driver information, contained on a given storage medium (usually a hard disk drive). Disk images are usually prepared by a software engineering group once a personal computer has been configured with all of the appropriate components (operating system, applications, utilities, TSRs, etc.). This configured computer is referred to as a "master". The disk images themselves are then replicated and distributed to remote manufacturing sites for installation on consumer machines.

Configuration and installation takes place prior to packing the unit for shipping in order to provide the consumer with a unit that is operable ("ready to run") upon receipt. Configuration of the unit encompasses partitioning the unit's hard drive, setting up boot information, and adding file directory structure information. Installation is the process of writing the physical software files to the hard drive.

Background: Zip Deliverables

The role of a software distribution system is to facilitate the transfer of software, which is to be released to the consumer, to the manufacturing site. Once at the manufacturing site, the software will be installed and configured on a raw (unformatted) hard drive or the hard drive of a newly assembled personal computer.

Current distribution techniques depend on a batch delivery system. The batch is composed of a disk image (namely, the set of files released for installation consisting of all required components) which has been compressed into a single deliverable unit. Compression is a process by which the disk image is condensed in order to take up less storage space. Such a unit is often referred to as a "zip deliverable", which is a reference to the compression utility, PKZIP™, most often used to create the compressed file deliverable.

Currently, zip deliverables are distributed in what is known as the drop method, that is, when any change is made to just one of the files constituting the zip deliverable, the entire deliverable must be rebuilt and redistributed (dropped) to the manufacturing site. Such a distribution method puts an even greater demand on transmission capabilities, since all rebuilt deliverables will need to be redistributed to the manufacturing facilities in a relatively short period of time. Without prompt updates, the manufacturer has to allocate greater resources to post-consumer fixes.

Background: Disk Image Disadvantages

The use of disk images for distribution of software has inherent disadvantages. First, the size of disk images needed to distribute complete system software configurations has grown almost exponentially in the past 10 years, from 30 megabytes to over 400 megabytes, due to the increased hard disk space requirements of more functional operating systems and feature-rich applications. Consequently, the storage media for the disk image must meet ever increasing capacity demands and distribution costs continue to rise.

Second, disk images are limited to one configuration. Changes in disk image configuration can result from any difference in hardware and software combinations. For each change in configuration, no matter how slight, an entirely new disk image must be built, replicated, and distributed. Most installation configurations tend to have one or more files in common, such as the operating system or user applications. This results in many files being duplicated and distributed multiple times. Large amounts of hardware storage space are required to store these common files multiple times, once for each minor difference in configuration.

Third, disk images cannot be updated. Once a disk image is built, it cannot be modified. Components that comprise disk images may need to be changed because of a software bug fix or new revision. If a component is changed, each disk image incorporating that component must be rebuilt, replicated, and distributed.

Finally, in addition to greater demands on storage space, the amount of time to distribute multiple disk images has greatly increased. With each different configuration, time must be taken to create its disk image. The disk image must then be distributed. The increase in the size of the disk image, even if the distribution system is computer network based, has a corresponding effect on the disk image transmission time. As the number of different computer configurations grows, improved transmission capability in terms of both speed and accuracy is required. Both speed and accuracy factor into maintaining efficient distribution of software to computer manufacturing facilities. Minimizing distribution time for disk images can be critical when updates to components have occurred to fix software bugs: The faster the disk image can be propagated to the installation site, the fewer the number of computers released with faulty software.

Background: Computer Manufacturing Constrainits

Mass-manufacturing of mid-market or high-end personal computers faces some difficult constraints: software must be released from a software engineering group and distributed to a computer manufacturing facility without alterations that would change the configuration for a particular machine. The complete hardware and software configuration must be carefully controlled, to avoid substitutions which introduce incompatibilities; the distribution process must be efficient in order to reduce the amount of information that is distributed; and revised system configurations must be manufactured and shipped very quickly in order to reduce the number of computers which leave the factory without the most current version of released software.

A further important constraint is time-to-market. The ability to meet consumer demands quickly, and provide the newest features as soon as possible, is crucial. Thus, the software pre-installation process must not be too rigid. It must remain in a state that allows new configurations and combinations of existing configurations to be integrated quickly and easily to satisfy changing customer demands.

Background: Database Management Systems

Many different database management structures are currently used in business and manufacturing process. Hierarchical, network, and object-oriented are a few of the structures that are common. Presently, the most common database structure is the relational database model. Its structure allows the data to be presented as a series of relations, that is, how each piece of data in the database relates, if at all, to every other piece of data.

This relationship presents itself most effectively when organized into tables. Keys are used to access the data in the table. Each table consists of data that is closely related. Each table has at least one key, the primary key, but can have other secondary keys. A database structure will consist of one or more tables, each table with one or more keys.

The structure is defined by the relationship of the data in one table to the data in another table. The relationships between tables can be none, one to one, many to many, etc. For instance, a table which contains a list of names may have as its primary key the combination of first and last name. A table which is related to this table and contains addresses, may also have as its primary key the combination of first and last name. If the requirements of the particular database structure were such that only one address per name need be stored, the relation of the first table to the second table would be a one to one relationship. That is, for every one name in the names table, only one address would be stored in the addresses table. If the database had a different purpose, e.g. to keep a list of past addresses, the relation of the names table to the addresses table would be structured as a one to many relationship.

Background: SQL

Information is most often retrieved from a relational database through a database query language known as Structured Query Language ("SQL"). SQL uses "relational algebra" to communicate to the database management system ("DBMS") and obtain the desired information. Relational algebra represents to the DBMS how to manipulate the relations that the existing tables of data represent to build new relationships that produce the desired collection of data. The DBMS is responsible for managing the tables of database which includes inserting, deleting, and updating information as well as retrieving information and maintaining database access security.

SQL is a formal language, which makes it quite uniform in its application across many different DBMSs. This makes the relational model a popular choice for a database structure. However, the relational model uses more space, time, and processing power (overhead) to produce its results. This overhead can occasionally reduce the effectiveness of a relational database model.

Background: Overhead

The most notable overhead problem in the relational database model is in the use of the binary large object ("BLOb") structure. BLObs facilitate the movement of data, usually files, with varying sizes and content. Most DBMSs support a BLOb data structure to allow manipulation of physical files, such as software applications, that would normally be managed in the computer's directory structure. The BLOb structure provides a convenient way to keep a data file with its associated database information. However, the overhead, in terms of system storage space and processing time, associated with using the DBMS to manipulate such large binary objects is sometimes not worth the convenience.

DBMSs for relational databases allow for the performance of actions outside the database context to take place when some specified database action is performed (a "trigger"). For instance, if a notification letter needs to be sent out whenever an address is changed, a DBMS trigger can be written which will be automatically executed by the DBMS whenever it performs an update to the address table. While convenient, this can also increase the overhead consumed by a DBMS.

Additionally, DBMSs have replication (or mirror) techniques which allow them to reproduce their entire database (structure and contents) to another location. Utilizing the DBMS replication techniques (like BLOb manipulation) takes increased overhead, but can be a convenient way to keep databases at remote facilities current and "in-synch" (that is, the databases contain the same data).

COMPUTER MANUFACTURING SYSTEM ARCHITECTURE WITH ENHANCED SOFTWARE DISTRIBUTION FUNCTIONS

The present application discloses a system of software distribution in computer manufacturing which manages and distributes software from release by a software engineering group to installation at a remote manufacturing site or testing facility. The distribution system disclosed seeks to overcome the deficiencies of present software distribution systems. In overcoming these deficiencies, the distribution system disclosed contains several innovative features.

One of the innovative features disclosed is the elimination of duplicate distribution of software which takes place under the present system. This duplicate elimination process reduces the amount of data transferred to remote servers by repeatedly eliminating duplicate files which may exist between materials provided by different software engineering groups.

Another of the innovative features disclosed is the use of processes within and outside of a DBMS to distribute released software files to the master isolated database and computer manufacturing facilities. This process validates database table entries for each SKU and ensures that the associated data files are also replicated accurately before the SKU is released for installation. This process is also capable of choosing which software files to transfer to the local server based on the types of installations the local server is to perform.

Another of the innovative features disclosed is the use of database structures which control the distribution of software files to particular sites. The use of a database in the distribution process will allow software files to be designated as test or production and be distributed to those facilities designated as test or production respectively. Further, software files can be designated to be distributed only to particular computer manufacturing or test facilities.

Computer Manufacturing Environment

The software distribution system of the presently preferred embodiment utilizes a database to manage the distribution of software from software engineering groups to remote computer manufacturing facilities.

Software released for installation by a software engineering group is placed into a database and given a unique identifier. Each software engineering group's database is merged into a single master database containing all of the released software from all of the software engineering groups. This database is then replicated to master databases at remote computer manufacturing and test facilities. From these databases, the software is distributed to individual local databases at the computer manufacturing sites and test facilities which will be used for actual installation of the software onto personal computers for consumer use.

Database Management of Software

Another innovation is the use of a database to manage not only the information concerning disk image releases (components in the image, version number of each component, etc.) but also to manage the distribution of the releases themselves to computer manufacturing facilities. This eliminates many of the disadvantages of the current software distribution mechanism. Further, the use of a database and its associated DBMS allows for a number of other innovative features in the present application. These innovations are possible because the use of a database in this context fundamentally alters the method of software distribution.

Most notably, the paradigm of the disk image is shifted. While the notion of a disk image is still used when software is introduced into the system by software engineering groups and software download at computer manufacturing facilities, the distribution of software to computer manufacturing facilities is removed from the current "one image per configuration" distribution method. The database is designed to manage the disk images on a component by component basis. Once the disk image is introduced into the database, it is broken down and tracked by its component parts. Component parts of a disk image may include, for example, the master boot record, the hard drive boot sector, the partition tables, the directory structures, and the actual files on the hard disk. Since components of a disk image can be the same across many configurations, this component by component tracking allows for elimination of duplicates.

Database management of the software distribution system also reduces the overhead of rebuilding and distributing disk images for each machine configuration. Such rebuilding and redistribution takes place automatically whenever a change is made to any component which is part of the machine's configuration. It also allows for updates or fixes to be made to individual software components without the need to rebuild and distribute each disk image that has been effected by the change.

Second, when software is released by a software engineering group for distribution, its history is maintained in an as-installed manner. (That is, the database maintains a representation of the software in the way it appeared on the machine from which it was installed and the way it should appear on the machine on which it will be installed). Even though the image is maintained by the database in a component by component manner, the database information stored about the image is used to reconstruct it into its as-installed form.

Third, storing the software in the database and eliminating any duplicate files allows for a reduction in the distribution time from software release to factory installation. The network connectivity of the distribution databases allows for substantially reduced times in distribution. Further, due to the elimination of duplicates there is less physical data to transmit to the manufacturing facility.

Finally, use of a database to manage the distribution of software provides a convenient way to control the distribution channels of the software. Since not every release will be needed at each manufacturing site, DBMS replication techniques can be controlled to distribute the software to only those sites at which it will be required. This provides a way to distribute software through the distribution system for testing purposes as well as lowering the storage capacity requirements for the databases at the end of the distribution system since they will not be required to store all of the software released by each engineering group.

Elimination of Duplicates

One of the features disclosed in this software distribution system is the use of a series of databases to effect the elimination of duplicates. The system architecture is structured in a manner that eliminates duplicate software releases by the various engineering groups. Each transfer of software, from database ingest to distribution at the manufacturing installation site, is utilized as an opportunity to discover and eliminate duplicate software releases.

Database ingest routines are used by software engineering groups to release software into the database for distribution to remote computer manufacturing sites. An "ingest routine" is a procedure for formatting raw data into a form that can be used by the DBMS to insert, delete, and update information in the database. In a relational database model, data is usually formatted by the table to which it relates, and then an entire table entry is made with one DBMS transaction. In the present application, data can be ingested into the process at multiple points. In the presently preferred embodiment, the database ingest procedure breaks disk images down into their component parts. These component parts are then cataloged in a database. Unique identifiers represent the disk image (a stock keeping unit, "SKU") and its association of component parts (a bill of materials, "BOM"). Elimination of duplicates in this manner allows for more efficient use of hardware storage capacity as well as reducing the amount of time required to distribute software from a software engineering group to the manufacturing installation site.

A properly structured database, as in the disclosed software distribution system, has several advantages. First, a properly structured database needs to manage only one of each instance of a particular component. Therefore, when several configurations make use of the same file, only one copy of the file needs to be stored. Since only one copy of the file is stored, only one copy of the file is distributed to the remote manufacturing site. This eliminates duplication which takes up valuable storage capacity, thereby reducing the total capacity needed to store the same number of machine configuration disk images. In addition, transmission times are reduced as there are physically fewer files that must be distributed. Once the file is in the database it will be distributed to the manufacturing site.

Elimination of duplicates is a process that begins at data ingest, when the data is first placed into the database. At data ingest, the database can be queried to find an entry that is the same as the file about to be entered. If there already exists an entry for the identical file, the information about the file can be stored without storing the physical file itself. In this manner, the database can manage the image at the component level, allowing a single copy of a file to be referenced for multiple configurations. (Referencing, in database terms, is the process of obtaining data.)

Because the database can manage the disk image at the component level, updates or bug fixes to components do not force an entire rebuild of each image. The database can incorporate the new revision into its disk image description for each image that makes use of the component.

Distribution to Manufacturing Sites

Another of the features disclosed in the software distribution system is the use of processes outside the DBMS replication process to manage the distribution of software releases to the local servers at computer manufacturing and test facilities.

Due to the database structure and ingest procedure there is less data to transfer to the manufacturing sites. Further, because the database can be put into network contact with databases at computer manufacturing facilities, distribution can be accomplished in a fraction of the time required by the current zip deliverable drop method. Important to the distribution process is the use of database replication techniques and supporting software processes to distribute the information on SKUs, BOMs, and components, as well as the components themselves, to the computer manufacturing facilities. In reliance on database interconnectivity and replication processes, a software engineering group is empowered to release a steady stream of updates to various components of disk images without concerns of timing or cost of redistribution while maintaining an as-installed character.

Software routines work with DBMS replication techniques to distribute the software from software engineering groups to local server databases at the remote computer manufacturing facilities. The preferred embodiment does not utilize DBMS structures to store the physical software files. DBMS structures, such as the BLOb, require tremendous amounts of overhead to track each software file. Therefore, the files are stored on the database server, but outside of the database structure. Separate routines manage the replication of database and data and their associated software files.

The first routine is responsible for isolating software released by a particular software engineering group into a separate isolated database, one for each group. This isolation routine requires that any new SKUs be added to the isolated database with their associated BOMs. Further, any software files that are not already stored are transferred to the isolated database server, along with their database references. In this manner, duplicates that exist between the software engineering database and the isolated database are eliminated. Also, any revisions to existing components of current SKUs or BOMs are updated.

The second routine is responsible for transferring and merging the information in the individual isolated databases (and their associated software files) into a single master isolated database (and server for the associated software files). The master isolated database contains information for all disk images created by each software engineering group. All of the actions of the first routine are required on a division by division basis. Additionally, this second routine must eliminate any duplicates which have occurred across software engineering groups.

The transfer of software and database information from the master isolated database to master databases and local servers at computer manufacturing facilities is guided by several processes. The transfer from the master isolated database to each computer manufacturing facility's master server is accomplished by making use of DBMS replication techniques.

DBMS replication techniques are provided in most DBMSs. They provide a convenient way to copy (or mirror) a database from one site to another. Database trigger code is used to create a catalog which contains a reference to each new software file that will need to be transferred. Since the physical software files are not kept in the database, a second process must perform the transfer from each single isolated master database to the master server. The second process references the catalog created during database replication and transfers the new and updated files to the master server.

Once these two processes are complete, a suite of processes works in combination to replicate the database and selectively transfer the necessary software files to the factory line server. The first process, again, is the replication function provided by the DBMS. Triggers are used to create a catalog containing references to the SKUs which have been added or changed and fall under the particular line server's build plan. (The build plan is a list containing only the SKUs that the particular factory line server will need for its software installation duties). Even though the entire database is replicated onto the factory master server, only those software files and their related SKUs which will be used by the particular computer manufacturing facility line sever need be verified and transferred.

Utilizing an independent process to populate the factory line server with the physical software files allows for reducing the set of files transferred to those that will actually be used by the factory line server in the computer manufacturing process. Factory line servers can be configured for the installation of software on only one type of hardware (i.e. desktop, portable, etc.) or for the installation of software to be distributed to a particular region (i.e. Asia or Europe). This transfer process allows the factory line servers to have lower storage capacity demands, thereby lowering the cost and increasing the speed of the distribution process.

The second process goes through the catalog of SKUs and verifies the replicated SKUs for internal consistency. Since high volumes of data are distributed, it is useful to verify that the software to be placed on the facility line servers is in the same condition as when it left the software engineering group. To accomplish this, a check is made on the contents and the size of the file to ensure it matches the stored information from the same check procedure which was performed by the software engineering group when it was released.

The second process also creates a catalog containing references to the software files that will need to be transferred for this particular line server. The final process transfers the software files that are listed on the previous catalog.

Distribution Gating

Another of the disclosed innovative features is selective distribution to computer manufacturing sites. Software distribution management via a database allows for each SKU which exists as an entry in a database to designate which computer manufacturing sites will receive it and its associated information during the distribution process.

One advantageous class of embodiments allows both software that is still in testing as well as production software to be released into the same distribution system. The test data can be distributed selectively to test manufacturing sites, which may reside in a particular software engineering group. There, a software installation can be performed to ensure that the software, as installed, has flowed through the distribution system correctly. This ensures that the software configuration and distribution processes have functioned correctly. Thus, the consumer will receive a personal computer that is properly installed and configured and is in a ready to run condition upon receipt.

Further, this innovation can be relied on to distribute software released for installation in consumer machines to particular manufacturing sites. This has the primary effect of reducing the time, cost, and capacity demands of distribution.

Advantages

The advantages of the various disclosed innovations in the optimized distribution model are numerous.

One advantage of the innovations is reduced distribution time.

Another advantage is lower distribution cost, since duplicate components of images will not have to be produced and distributed to remote computer manufacturing sites. Further, separate disk images for each minor configuration change will not have to be produced and distributed.

Another advantage is lower demand on storage capacity, because files that remain the same across configurations will no longer have to be distributed multiple times.

Another advantage is more efficient updating: Updates can be released at any time, without the need to rebuild multiple disk images and without the delay usually associated with their distribution.

Another advantage of the innovations is that use of a DBMS to distribute the software files adds a layer of security, due to the security features inherent in the DBMS. This security is in effect even at the computer manufacturing facility. The DBMS can control access to the database information, and even those that can access the database can be limited to read only privileges.

Another advantage of the disclosed innovations is the ability to meet consumer demands with delivery of a reliable product in a very short period of time.

Another advantage of the disclosed innovations is the capability to feed Quality-Control solutions back into the manufacturing process more quickly.

Of course, it will frequently be necessary to build a single configuration repeatedly. Another advantage of the preferred system is its ability to respond efficiently to large orders of similar configurations. The database ingest process can be used at the computer manufacturing facility to introduce a new configuration into the software distribution database. A single SKU Component is created to store the disk image from the assembled unit to the factory line server.

A further advantage of the embodiments is ease of manufacturing support for built to order and configured to order computers combined.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
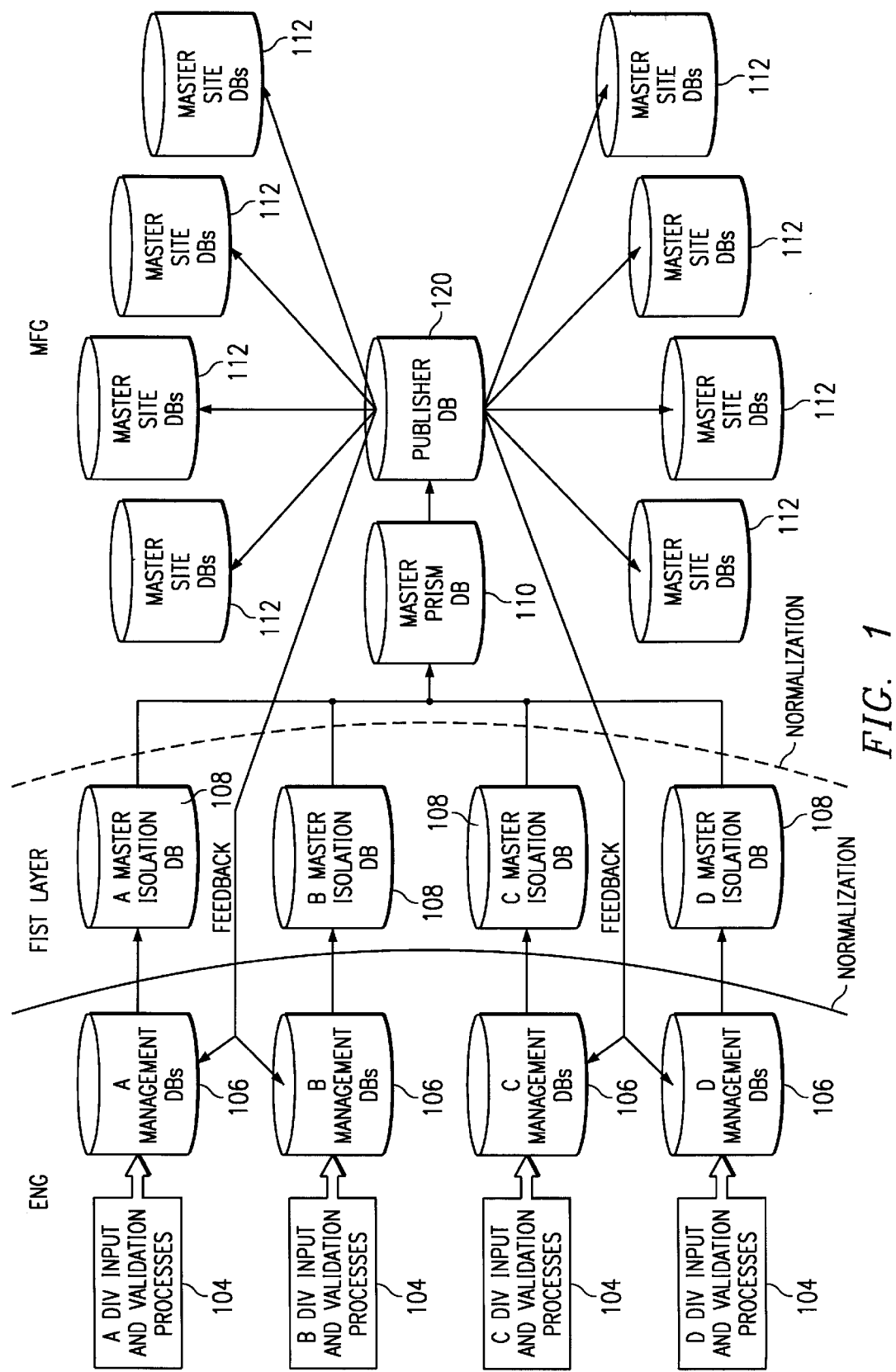
FIG. 1 shows an architectural overview in block diagram form of the hardware, interconnectivity, and process flow preferably used to embody the novel computer manufacturing software download distribution system.

The numerous innovative teachings of the present application will be described with particular reference to the sequence of operations used at Compaq Computer Corp., but are not limited to this presently preferred embodiment. This class of embodiments provides only a few instances of the many advantageous uses of the innovative teachings herein. In general, statements made in the specification of the present application do not necessarily delimit any of the various claimed inventions. Moreover, some statements may apply to some inventive features but not to others.

As software applications to run and support personal computers continue to become more functional and feature-rich, their physical size will also continue to grow. This directly affects the distribution systems used to deliver software configurations to be installed prior to consumer sale. As the number and size of different configurations grows, the system must be updated to continue to provide an effective distribution mechanism.

A system of software distribution that incorporates management of data via a database, such as the one described in the present application overcomes many of the present difficulties in the present software distribution system.

Further, it allows minimization of storage requirements at the computer manufacturing sites while maximizing the flexibility of software configurations that can be installed. Minimization of storage requirements also provides for faster transfer times during software distribution.

Utilizing this distribution architecture, multiple software engineering groups may release software to be installed in various personal computers with a minimum of cross-departmental coordination. The released software is maintained in the distribution system until it is installed on a personal computer at the remote manufacturing site. Installation at the manufacturing site instead of relying on the consumer for installation ensures proper configuration of the machine and minimizes the overhead of customer support.

Definitions

BLOb ("Binary Large Object"): A data type which can be stored in a database as a non-fixed length record. Typically used in storage of text or various kinds of binary images.

BOM ("Bill-of-Materials"): In this document, BOM refers to a software bill-of-materials. A BOM is associated with a list of compressed and/or non-compressed software files that are copied to a Compaq computer during software pre-installation.

BTO ("Build to Order"): Building the orders committed by the manufacturing due date. The orders are based upon Compaq standard SKUs.

CIIT ("Consolidated Image Importer Tool"): A prior art utility which checks each one of the files of a finished PC system into a database.

CTO ("Configure to Order"): Building to a unique configuration specified by the customer for which no Compaq standard SKU exists.

DBMS ("Data Base Management System"): A product that supports the reliable storage of the database, implements the structures for maintaining relationships and constraints, and offers storage and retrieval services to users.

ERD ("Entity Relationship Diagram"): A graphical representation of the relationship present in a relational database.

FAT ("File Allocation Table"): The information used by operating system software to manage files on a hard disk.

FIST ("Factory Isolation Standard Tables"): The main interface by which all installation data shall flow into the factory. The "front-end." A group of isolation databases—one per division.

FUN ("Functional Normalization"): A process of elimination of duplicate files between divisions.

GEMINI: An image builder/data blaster download tool for both surrogate and direct downloading.

"Golden master machine": In Compaq preinstall context, refers to a machine which has the latest release candidate (s) of software installed on it. A utility such as CIIT can be used to literally scan the entire file configuration of the golden master into a master database for later use in duplication in the factory. The entire conglomeration of software on the golden master becomes associated with a SKU/BOM combination with the preinstall/install system in use today.

Ingest: A procedure for formatting raw data into a form that can be used by a DBMS to insert, delete, and update information in the database Line Server: A file server which serves at least one assembly line for installation of files on the hard disks of assembled Compaq PCs. In the system behind FIST, the line server becomes mainly a host for a DBMS-based storage of the files to be installed.

MBR ("Master Boot Record"): The MBR contains minimal operating system code to load the boot sector of the partition marked as startable (or bootable), and the description of the partitions located on the hard disk.

Master Server: A file server with massive storage resources is used as the central repository for all installable files in a Compaq factory today. In the system behind FIST it becomes mainly a host for a DBMS-based storage of the files to be distributed to line servers in each factory.

PRISM ("Preinstall Reengineering Initiative for Software Management"): The computer manufacturing software download distribution system.

Ready-to-Run: Software that has been unbundled and configured and which requires little or no further modification to run on the user's machine. Also known as RTR.

Replication: A feature of SQL Server 6.x (and many other DBMSs) which is being exploited by FIST to replace the current file transmission system in use between Houston and the factories. It allows all or just certain records to be copied under certain criteria to other databases using a 'Publish and Subscribe' metaphor where one database is the publisher and all subscribers get data copied to them from the publisher.

SKU: ("Stock Keeping Unit"): A SKU is created from the part number. The description identifies the CPU, the primary hard disk, the country/keyboard and whether or not software will be pre-installed in the factory during manufacture.

SQL: ("Structured Query Language"): A language method of accessing and maintaining a database. Also used to refer to the database itself that uses this type of language.

User: A person who operates the surrogate or direct download system.

Summary Overview

The preferred embodiment discloses a system of software distribution which manages and distributes software from release by a software engineering group to installation at a remote manufacturing site or testing facility.

Software released for installation by a software engineering group is placed into a database and given a unique identifier. Each software engineering group's database is merged into a single master database containing all of the releases from all of the software engineering groups. This database is then replicated to master databases at remote computer manufacturing and test facilities. From these databases, the software is distributed to individual databases at the computer manufacturing sites and test facilities which will be used for actual installation of the software onto personal computers for consumer use.

General Organization of Database Servers and Process Flow

FIG. 1 shows an architectural overview in block diagram form of the hardware, interconnectivity, and process flow preferably used to embody the novel computer manufacturing software download distribution system. This system is designed to provide efficient software distribution which accommodates parallel software engineering efforts and remote distribution facilities. The software download distribution system allows for release of software by one or more software engineering groups 104, each with its own development schedule, into management databases and their associated servers 106 via a database ingest tool. The software download distribution system then digests these released files into master isolation databases and their associated servers 108. The digest procedure ensures that no duplicates exist in the isolated database. The released files in the master isolation database are then merged with the released files in the master isolation databases of other software engineering groups into the master PRISM database and its associated server 110 which contains only files currently released (for production, alpha or beta testing, etc.) and only one such instance of these files.

This master PRISM database is replicated to master site databases and their associated servers 112 at various computer manufacturing facilities or test sites. From these master databases, software is distributed to one or more local databases and their associated servers for download onto personal computers in either a predetermined, build to order, or configure to order configuration. The configuration of the hardware can vary according to the needs of the distribution system. Taking into account the size of the database, the speed of processing and distribution desired, the distribution network configuration, and the method of software installation, numerous variations in hardware configuration can result.

The interconnectivity of the hardware in the presently preferred embodiment is accomplished through local area network (or "L,AN") and wide area network (or "WAN") connections. Of course, many different connectivity schemes exist and can be utilized effectively in this software distribution process. Factors such as the amount of data to be distributed, the speed of distribution desired, and the locations of the destination servers will be important in the determination of the proper medium for each distribution leg.

The databases utilized in the preferred embodiment are organized according to a relational model. That is, the data elements are organized in and accessed via table structures, the tables bearing relationships to one another. The database management system (DBMS) supporting the database in the preferred embodiment is Microsoft's SQL Server™. The DBMS is responsible for implementing the database structure and reliably storing the data elements. The DBMS is also responsible for maintaining the data when inserts, deletion, or updates are made.

There are several database models which could be utilized in the software distribution process, each with several DBMSs. Amount of data, speed of processing, and ease of manipulation are all factors which bear on the choice of a database model and its associated DBMS. The choice of a relational database model managed by Microsoft's SQL Server™ was made because both are proven, industry-standard tools. However, even in the realm of relational database models, several DBMSs exist which will be recognized by one skilled in the art of database administration as just as effective. Alternatively, database models such as object-oriented and deductive models and their associated DBMSs, although relatively recent developments, may offer reasonable replacements for the relational model.

The table structure or entity-relationship diagram (ERD), which constitutes the relational database used throughout the software distribution process will first be described in great detail. The process of introducing software into the software distribution system will next be discussed, since that process provides the disk image breakdown necessary for the preferred embodiment of the software distribution system. Then, the process by which data is isolated from management databases and their associated servers 106 into master isolation databases and their associated servers 108 will be described.

Next, the merging of data from all of the master isolation databases and their associated servers 108 into the master PRISM database and its associated server 110 will be described in detail. The master PRISM database 110 replication to master site databases and their associated servers 112 at various computer manufacturing facilities will then be discussed, followed by a description of the master site database 112 replication to local databases and their associated servers at the computer manufacturing facilities.

Finally the software download process from local databases and their associated servers to computers and hard drives will be described.

The Relational Database Structure

Figure 2:
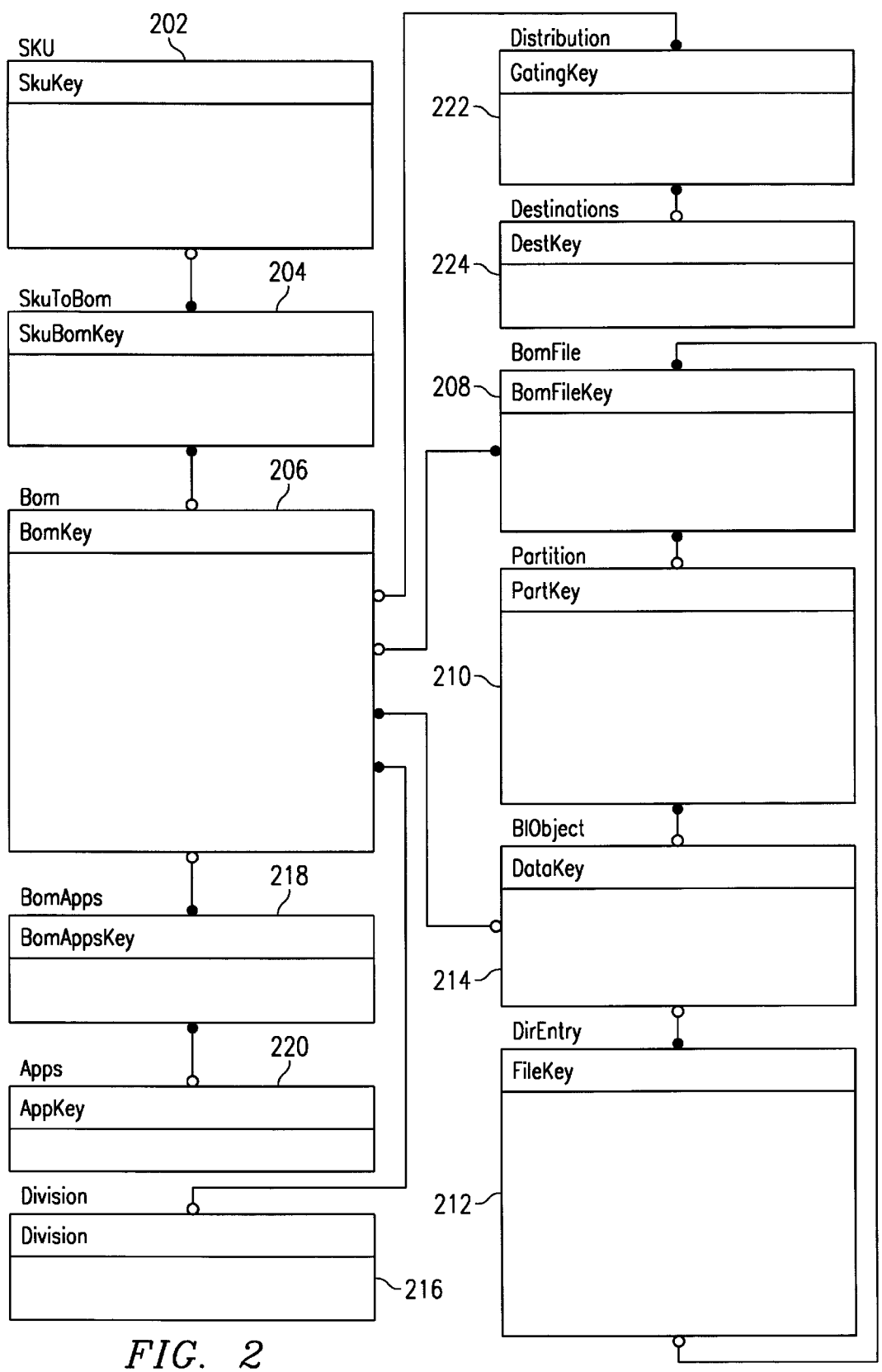
FIGS. 2 and 2A show an Entity-Relationship Diagram which describes the relational database structure utilized in the novel computer manufacturing software download distribution system.
Figure 2A:
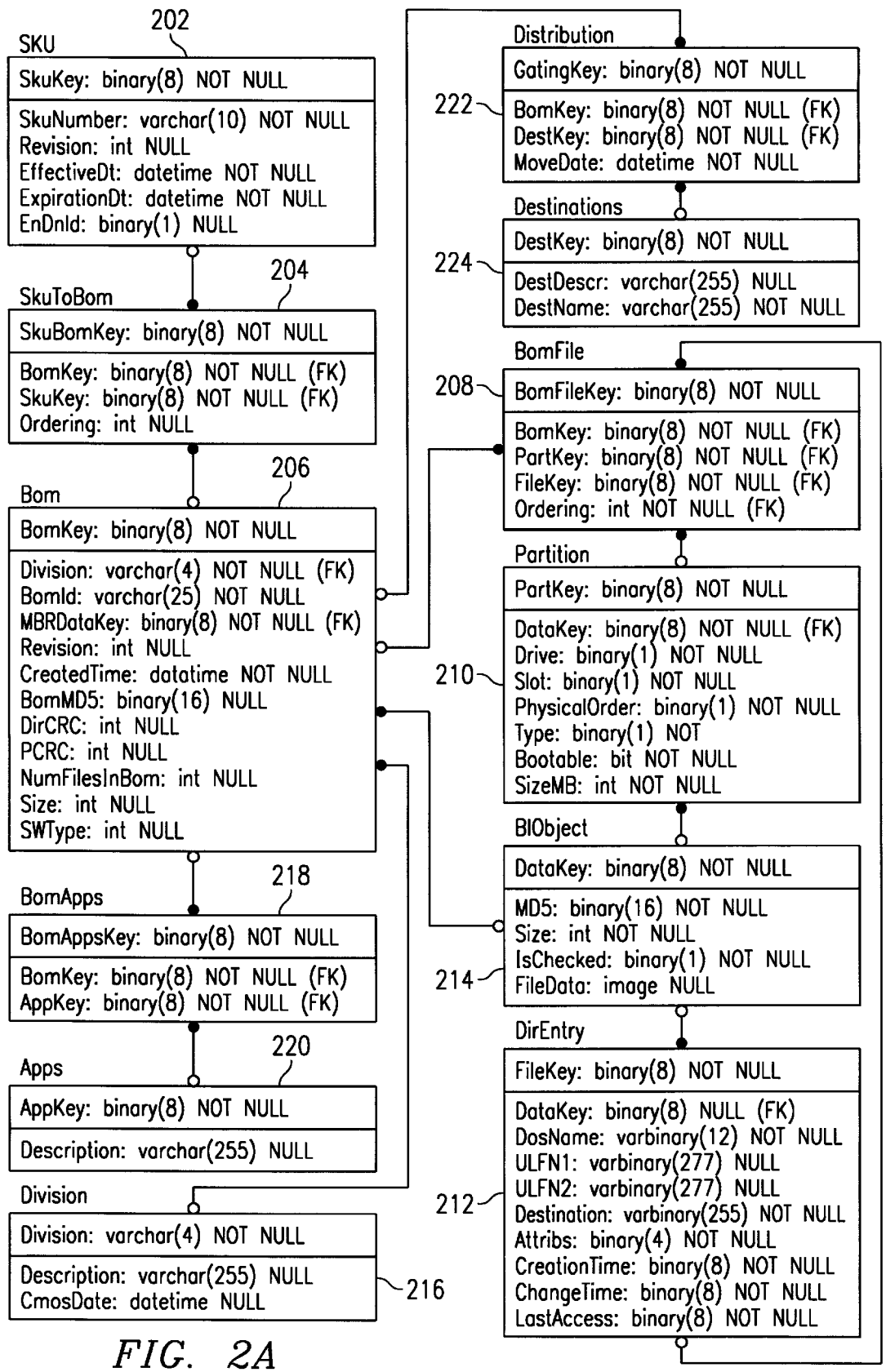

FIGS. 2 and 2A show the ERD which describes the relational database structure utilized in the preferred embodiment. Tile ERD defines to the DBMS how the data will be retrieved, deleted, added, and updated in the software distribution system. The ERD has been optimized in order to take minimal storage space in fully describing the released software. In this view of the complete tables, it will be noted that there are primary key fields on many of the tables. These special keys are generated automatically on insertions to those tables, and are necessary for replication purposes. In some cases, where it is necessary to include the primary key from one table as a foreign key in another, it is necessary to query back the table entry just made to get this primary key.

SKU Table 202

The SKU table 202 is the means by which effectivity and expiration dates are associated with a SKU as well as storage for the actual SKU number. It also provides a means to mark a SKU as disabled for download, and therefore not yet ready to be used by the factory. The SKU is part of the core information because the SKU/BOM relationship is considered essential from the standpoint of corporate information systems and therefore the SKU number is a "NOT NULL" field. (A "NOT NULL" filed must contain a value). The SKU number is user-defined (subject to SKU numbering conventions) and is not a primary key. Effectivity and expiration dates are not optional and must be entered. An EnDnld flag value of zero indicates a non-release version, in other words, the SKU is not yet ready to be distributed. This flag must be set to non-zero to enable downloading capability by download tools in the factory. NULL EnDnld flag values are converted to zero upon input into the factory databases for consistency purposes. The Revision filed provides a means to keep multiple versions of the same SKU (pointing to a specific version of a BOM) which can then be called up for downloading by the test versions of the download tools. This field is an integer value that is assigned a unique value by the database if the value inserted is zero or NULL. The SKU record entry is necessary to pass integrity checks at the master PRISM database layer. This is mainly because of the necessity for the factory to use the SKU number in calling up a BOM in the download tools. A BCOM inserted with no SKU would be deleted if not referred to by a top-level SKU.

SkuToBom Table 204

The SkuToBom table 204 will require entries to be made when a SKU is associated with a BOM. It allows one or more SKU IDs to be associated with a BOM number. It also allows more than one BOM to be associated with one SKU ID. The Ordering value is used to specify the order BOMs should be installed. This value is entirely up to the divisions to determine and will not be assigned automatically.

Bom Table 206

The Bom table 206 contains master information for each BOM number including when it was created and last updated. An optional distribution list for the BOM can be linked in through the primary key of this table to tell the distribution gating logic exactly to which database servers this BOM should be copied. Different divisions can use the same BOM IDs because the Division field is considered as part of the insertion criteria along with Revision.

BOM ID is not a primary key and is user-defined. The Revision field provides a means to keep multiple versions of the same BOM ID and is primarily for use during the preinstall engineering process. This field is an integer value that is under the control of the product systems engineering division. If the Revision field is zero (or NULL) during insertion, then the database will automatically assign a value starting at 1 the first time and incrementing for each new version. Revision can also be explicitly set by the insertion, but it must be unique over all previous records with the same BomID and Division fields. The download tools in the factory ignore Revision. The Created Time field is a datetime type to indicate when the BOM was put in the table. The SWType field is used for configure to order builds to categorize SKU Components. This is to assist the download tools in determining which components are Master SKU Components and Operating System components. These components must be installed first and second, respectively. The following values defined for the SWType field are bit fields and can be combined:

| Value | Definition | Meaning |
| --- | --- | --- |
| 0 | Undefined | Used for current SKU Images. |
| 1 | Master SKU Component | Defines partition information. Must be first in download sequence. |
| 2 | Operating System | Defines a SKU Component that contains the operating system. Must be second in download sequence. |
| 4 | Device Driver | Defines a SKU Component that is a device driver. No ordering is implied, but it must be installed after the Master SKU Component and the Operating System. |
| 8 | Application | Defines a SKU Component that is an application. No ordering is implied, but it must be installed after the Master SKU Component and the Operating System. |

The total accumulation of all the individually calculated BLOb MD5 values of the BOM, CRC-32 values for Directory and Partition as well as number of files and size of the entire BOM contents are included in BomMD5, DirCRC, PCRC, NumFilesInBom and Size respectively. MD5 is a message digest protocol used to generate public keys for messages in the RSA/digital encryption schemes. The MD5 value derived from using the MD5 protocol against an individual file has a high probability of being unique and can therefore be used, in conjunction with the file's size, as a unique identifier for the file.

BomMD5 is calculated by taking each file's calculated 128 bit (or 16 byte) MD5 value and adding each of the individual bytes into a counterpart byte (without carry to the next byte) in a 128 bit accumulator (which was initialized to zero in the beginning). In other words, byte 0 of the current file's MD5 value is added to byte 0 of the accumulator, byte 1 of the file to byte 1 of the accumulator and so on. Because of the lack of carry between bytes, the addition is obviously not 128-bit precision. This does not, however, diminish the value of this field as an overall 'checksum' accumulation cumulation of all the MD5 values for the database. All of these values are used as check values on the integrity of a given SKU/BOM and its contents. MBRDataKey points to the master boot record (in the BLObject table 214) for the BOM. The partition information in the master boot record must be nulled out before insertion into FIST, to guarantee correct normalization and for proper use with the download tools. The zero-based offset within the partition table is at 0x1BE and is 96 decimal bytes in length. Since the boot sectors are not considered files, they are therefore not included in NumFilesInBom nor are their MD5 calculations included in BomMD5.

DirCRC and PCRC are accumulations of individual CRCs generated by passing the individual fields of the DirEntry and Partition records for a BOM to some pre-defined functions which incorporate them into structures in memory, making sure that unused parts are NULLed out, and then calculating the CRC-32 of that buffer and passing that back to the caller. It is then the caller's responsibility to keep an ongoing accumulation of the DirCRC and PCRC values by adding the individual values returned from the pre-defined functions together using normal addition on the unsigned long.

These values should be set when inserting a BOM into the database. They can be used for verification at any given server to make sure the information is the same as that originally put into the database.

BomFile Table 208

The BomFile table 208 establishes the relationship between BOM ID and the files associated with the BOM as well as what partitions they should be installed in. When inserting entries into the BomFile table, the ordering column must be set to indicate the BomFile entry extraction order for each BOM. In other words, the first file to be installed on the hard drive must be the one with the lowest numerical value for the whole BOM in its Ordering field. The most common way this is done is to iterate through the example hard disk that is being scanned and as new entries are being inserted into the BomFile table, the Ordering column is increased by one over the last entry. The order can start at 0 or 1. This is particularly important because currently, with some Microsoft operating systems, two files are ordering sensitive: 'MSDOS.SYS' and 'IO.SYS' must be the first two files in the root directory for the hard disk to boot correctly. Other than that, the ordering will preserve the general look that the hard disk had when its state was scanned into the database with CIIT or a similar tool.

Likewise, when extracting records for software downloading purposes from a BOM using the BomFile table 208, the records must be ordered in ascending order according to the Ordering field. This is important in order to duplicate the ordering that was found on the original hard disk onto the target hard drives. After the initial closure of entries into the BomFile table 208, no more entries can be added to an existing BOM. Closure is defined as the moment that the values for BomMD5, DirCRC, PCRC, Size and NumFilesInBom in the BOM table 206 are written and no longer NULL.

Once the database detects this, it will no longer allow inserts into the BomFile table 208. This is implemented through database trigger code. A new BOM revision will have to be added with the extra files.

Partition Table 210

The Partition table 210 contains hard drive partition information for all the possible machine configurations represented in the tables. Most of the columns in this table are mandatory when a BOM/FILE combination is being entered into the system. The data here is normalized so a very common partition entry will serve for many configurations Normally BLOBs are pointed to through the DirEntry table but there is an exception in this case since there is no directory entry for a boot sector. The DataKey in the Partition table 210 points to the boot sector for the partition. The operating systems currently supported by the software distribution system allow only one bootable partition per drive. Therefore, the software distribution system allows only one bootable partition per drive.

The Drive field specifies the physical drive the partition resides on. Usually this value is 0, but for multiple drive systems this value is the zero based drive number in the system.

The SizeMB field, when zero in value, indicates a partition that covers the whole drive (or rest of drive), whatever size that may be. Otherwise the value in this field reflects the size, in Megabytes, for the partition. Slot is the partition number (0 to 3)—this value cannot be NULL. This is the slot in the partition table. This is interpreted as follows:

| Value | Meaning |
| --- | --- |
| 0 | Primary partition |
| 1 | All extended partitions. Physical order specifies each individual extended partition. |
| 2 | System Partition |
| 3 | Not used for user partitions |

PhysicalOrder allows ordering control for the partition. PhysicalOrder cannot be NULL. The first physical sector (Head 0. Track 0, Sector 1) of a drive is known as the Master Boot Record (MBR). The MBR contains both the intelligence to load the boot sector of the partition marked as startable (or bootable), and the description of the partitions located on the harddrive. The intelligence is located within the first 217 bytes of the MBR, and varies with language. The partition information begins at an offset of 0×1BE from the start of the MBR. There can be at most, four partition entries in the MBR; each containing 24 bytes of information. A partition entry will contain the partition's FAT File System type (Dos-12, Dos-16, Extended, BigDos, . . . ), bootable status, starting and ending location (heads, cylinders, sectors), relative sectors, and the number of sectors that make up the partition. The following diagram should help visualize how the 4 partition entries would appear.

Although the above table reads from right to left, the bytes on the harddrive do not. When working with these entries at a low level such as this, it is useful to have a disk utility such as Norton Utilities handy. This application snaps these values to the correct offset in the MBR for you. The bytes and offsets are as follows:

| Field | No. Bytes | Part1 | Part2 | Part3 | Part4 |
| --- | --- | --- | --- | --- | --- |
| System Type | 1 | 0x1C2 | 0x1D2 | 0x1E2 | 0x1F2 |
| Bootable | 1 | 0x1BE | 0x1CE | 0x1DE | 0x1EE |
| Starting Head | 1 | 0x1BF | 0x1CF | 0x1DF | 0x1EF |
| Starting Cyl | 2 | 0x1C1 | 0x1D1 | 0x1E1 | 0x1F1 |
| Starting Sect | 1 | 0x1C0 | 0x1D0 | 0x1E0 | 0x1F0 |
| Ending Head | 1 | 0x1C3 | 0x1D3 | 0x1E3 | 0x1F3 |
| Ending Cyl | 2 | 0x1C5 | 0x1D5 | 0x1E5 | 0x1F5 |
| Ending Sector | 1 | 0x1C4 | 0x1D4 | 0x1E4 | 0x1F4 |
| Rel. Sects | 4 | 0x1C6 | 0x1D6 | 0x1E6 | 0x1F6 |
| No. of Sects | 4 | 0x1CA | 0x1DA | 0x1EA | 0x1FA |

When working with a primary partition, (having a system type of FAT-12 or FAT-16) the starting location is straightforward. In the above example, the primary partition starts at head 0, cylinder 2, and sector 1. At this location, the primary's bootsector will be found; this describes the specifics such as bytes per sector, sectors per cluster, number of FATs, number of root directory entries, number of sectors per FAT. With this information, the operating system can be located and loaded.

Unlike the primary partition, the extended partitions are not so simple. In the example above, the starting location of the extended partition was at head 0, cylinder 513, sector 1. This location does not directly point to the logical drive; rather it points to another partition table containing at most, two entries. The first entry will be of type FAT-12 or FAT-16 to reflect the actual logical drive. The starting location that is indicated by the first entry of this table represents the starting location of the actual logical drive. If the second entry exists, it represents the location to the next extended partition table, where another (second, third, etc.) logical drive could be located. However, if the second entry is blank (all zeroes), there are no more extended partition tables, and thus, no more logical drives are defined. In summary, the logical drives are strung in a chain of extended partition tables. In order to find the next logical drive, the next table

|  |  | Starting Location | | | Ending Location | | | Rel. | # of |
| --- | --- | --- | --- | --- | --- | --- | --- | --- | --- |
| System | Boot | Head | Cyl | Sect | Head | Cyl | Sect | Sect | Sect |
| DOS16 | Yes | 0 | 2 | 1 | 63 | 513 | 63 | 8064 | 2064384 |
| Extend | No | 0 | 513 | 1 | 63 | 514 | 63 | 2068416 | 8062 |
| DOS16 | No | 1 | 0 | 1 | 63 | 1 | 63 | 63 | 8001 |
| ? | No | 0 | 0 | 0 | 0 | 0 | 0 | 0 | 0 |

The first partition entry states that the partition is of type DOS 16 which indicates that the fields that correspond directly to the assignable clusters on the disk are 16 bits long. The next column indicates that the partition is marked as bootable; consequently, when the system is turned on, this is the partition that the system will boot from. Next. the starting and ending location of the partition are stated; these locations are relative to the drive's physical beginning. Similarly, the relative sectors indicate where the partition begins relative to the beginning of the drive and the last entry contains the number of sectors in each partition.

must be located first. Again, having a utility such as Norton Utilities™ is a great help in visualizing how the tables are connected.

The processes which perform software installation (GEMINI), described below, retrieve the partition information from a SQL Server based on the SKU number entered. The tools query the number of partitions to be made, size of each partition, slot in the MBR, physical order of the partitions, type of FAT, and Boot Status. Based on this information, the tools construct the partitions accordingly; they decide the starting and ending locations of the partitions, along with the relative sectors, and the number of sectors in the partition. The retrieved slot field indicates which entry in the MBR the partition will obtain. The physical order instructs the tools as to the order in which to create the partitions; that is, physical order of zero is the first drive created, one is the second, and so on. The system type, bootable status, and size are also required during the creation of the partitions. For example, suppose that the following information was retrieved during a download:

| | | | | |
|---|---|---|---|---|
| Physical Order = 0 | Slot = 2 | Type=04 | Boot=0 | Size=3 |
| Physical Order = 1 | Slot = 0 | Type=06 | Boot=1 | Size=0 |

The installation processes would first make a system partition of 3 Mb; because the 3Mb partition is marked as physical order 0 and slot 2, it would be the first partition created and the third entry in the MBR table (zero based), have a System Type of DOS-16 (04), and would not be bootable. Similarly, the primary partition would next be created as the first entry in the table having a system type of BIGDOS (06); it would be bootable, and since its size is zero, it would acquire the remaining space on the drive.

The software installation processes create partitions by "Physical order", therefore, the partition that is the last to be created should have its Size set to 0 so that it will take the remaining space on the drive. An example would be a situation in which there are no logical extended drives to be allocated, and the primary partition is set by physical order to be the last one. In such a case, the primary partition size must be set to zero in order to acquire and utilize all of the space on the drive. As another example, if there were requirements for a logical extended drive which was set by physical order to be the last drive, the primary partition would be a definite size, and the logical drive size would be set to zero, so as to acquire the remaining space on the drive (as it is now the last to be created). The following is a typical example for the creation of a system, primary, and two logical drives:

| | | | | |
|---|---|---|---|---|
| Physical Order = 0 | Slot = 2 | Type=04 | Boot=0 | Size=3 |
| Physical Order = 1 | Slot = 0 | Type=06 | Boot=1 | Size=400 |
| Physical Order = 2 | Slot = 1 | Type=04 | Boot=0 | Size=200 |
| Physical Order = 3 | Slot = 1 | Type=04 | Boot=0 | Size=0 |

Type specifies the file system that is to be loaded on the partition. This field is interpreted as follows:

| Value | Meaning |
|---|---|
| 0x06 | FAT 16 partition |
| 0x0B | FAT 32 partition. Machine supports Microsoft Int 13 extensions |
| 0x0C | FAT 32 partition. Machine does not support Microsoft Int 13 extensions. |
| 0x12 | System partition. (This value doesn't really specify a file system. However this value must be 0x12 for system partitions to be recognized.) |

There is a linkage through DataKey to a BLOb in the BLObject table 214 for boot sector storage for each partition (the boot sector being stored as another image in the BLObject table). DataKey is mandatory because every partition has a boot sector associated with it in FAT file systems. The only preparatory work that is necessary on the partition boot record before insertion: it should be inserted as a BLObject with the bytes from zero-based offset 0x0b to 0x1e NULLed out. The download tools will change any parts of the partition boot record that must be customized to the currently used hard disk type.

DirEntry Table 212

The DirEntry table 212 is part of the main core of mandatory columns/tables, this is the actual directory information for each file archived in the database. Since the duplicate data is not stored, the same data found in two different files with two different directory entries because of date/time or path differences will generate two different entries in this table but one in the BLObject table for the actual file data. DosName is the (up to) 8.3 (12 total with the dot) character name used in current FAT file systems. Destination path of the file should not include any drive letters and colons at the beginning. It should only be the path from the root of the drive. It should always begin with a backslash and end with one. Root directory is indicated with one backslash.

Since DosName and Destination are both stored as Var-Binary types in the database (because of double-byte character set issues) the actual binary strings will have to be converted to ASCII hex strings for correct insertion into the database. In other words, an ASCII '1' (as part of a filename), also known as a 31 hex, would be inserted into the database as a '0x31'. A full example for DosName might be the following:

IO.SYS=494f2e535953 hex in binary representation;
="0x494f2e535953" in HEX ASCII representation.

Or an example of a path inserted into Destination:

\WINDOWS\=5c57494e444f57535c hex in binary representation;
="0x5c57494e444f57535c" in HEX ASCII representation.

ULFN1 and ULFN2 fields contain up to 254 Unicode characters for a long file name at 127 Unicode characters each. If there is no long file name for the entry, both ULFN1 and ULFN2 are entered with at least the first Unicode character being a 16 bit zero (or Unicode NULL). If the long file name is 128 characters in length then all the 127 characters of ULFN1 are filled and word 0 of ULFN2 contains the last character of the long file name followed by at least one Unicode NULL. A full 254 Unicode character long file name means that there will be no Unicode terminating NULL allowed in ULFN1 or ULFN2. The actual specification for long file names is 255 Unicode characters and this means that the FIST interface would truncate the last Unicode character of a full 255 Unicode character name. This was considered a good compromise because of the un-likelihood of a full 255-character name.

CreationTime, ChangeTime and LastAccess are all stored as raw, untyped collections of 8 byte values in the database. This gives the flexibility to cover most all known file date formats: from DOS/16 bit to Unix/32 bit to NT/64 bit. The format used is the format for whatever operating system/file system the file was created for (specified by the Type field in the partition table). The values always start with byte 0 of the 8 bytes and progressively fill in the others depending upon the format and length. All unused higher bytes of the dates shall be zero.

The DataKey points to the BLOb entry that goes with the directory entry. A NULL DataKey indicates an empty file, directory/subdirectory name or volume label name. A 8.3 filename and long file name (w/Unicode) are both included for compatibility with all current Operating Systems/directory structures. Long file name is split up into two fields (SQL Server datatype limitations dictate this) to give 255 Unicode characters (16 bits each).

BLObject Table 214

To recreate a file on a target system, an association of Partition, DirEntry and BLObject is necessary. In the BLObject table 214, Size and MD5 are necessary columns during initial insertion. The FileData field should be left NULL to reflect the fact that the file data is not stored in the table but in the file system. Normalization of data is performed through the use of size and MD5 value during queries in this table. If a like MD5 and size are found, the data would not be allowed into the table. The IsChecked flag must be inserted as a 0 and is never set non-zero by the data provider. It is necessary to indicate to the system that the BLOb (or file) is completely copied into the system, with all of its data intact. This is accomplished by the user calling the stored procedure sp_bfcheck(DataKey). This will verify that the BLOb data is intact and will set the IsChecked flag. If the IsChecked flag is never set, the BLOb (or file) is considered invalid and will not be used by the DASH system nor further referenced in the factory tables. The BLOb file is then deleted along with any records that point to it. The DirEntry, Partition and BOM tables are not allowed to reference a BLObject entry which is unchecked.

BLOb File Naming Convention

During BLObject INSERT or BLOb File transfer from server to server, the system places BLOBs in files on a particular directory in a file system. The system uses the BLObject.DataKey value to generate a directory and file name for storing these BLOb files. The directory and file name are created by dividing the hexadecimal 16-character string representing the BLObject.DataKey value into chunks, separating byte-pair and single-byte sequences as subdirectories, and prepending the final string with a parent directory value for the start of the tree. The algorithm for "chunking" uses a 2-2-2-1-1 pattern of byte combinations to create the complete path and filename. For example, a BLOb with BLObject.DataKey value of 0x0102030456789a10 would be stored in the file system as \0102\0304 5678 9a10. dat If "\\sqI1_gla_01\d$\blobs" were used as a BLOb file destination directory, then the BLOb file would be stored with this filename:

\\sql_gla_01d$\blobs\0102 \0304 \5678 ⅜ 9a\10. dat

This naming convention provides a simple mapping between key values and file names. It also allows for a maximum of 256 file entries in any one file-level directory on the file system, hopefully minimizing the amount a directory search time needed to access individual files using Windows NT file system services. (There could be up to 65356 directory entries at any directory-level in this tree. However, the mechanism used for generating BLObject.DataKey values skips values, so this maximum number should never occur at this level.)

As can be seen, it is not evident which file is which in this hierarchy without first consulting the BLObject table. In any case, read-only access to the permanent file storage area can be provided by the server. This is primarily for security reasons and guaranteeing the integrity of data once it is in the FIST layer.

Division Table 216

The Division table 216 is a master lookup read-only table for identification of product systems-engineering divisions. Like the BOM id, this is not really necessary from a manufacturing standpoint but may be from a corporate information feedback view. Divisions are abbreviated as follows for key purposes:

CONS=Consumer
VAL=Commercial Value
VALP=Commercial Value Plus
PORT=Portables.

These can be changed and others can be added as needed by MSSE.

BomApps Table 218

The BomApps table 218 establishes an optional relationship between a BOM and an application.

Apps Table 220

The Apps table 220 contains all the apps that may be declared for the group of BOMs represented in the tables.

Distribution Table 222

The Distribution table 222 allows optional gating distribution of a BOM to a particular factory database server destination for use during replication in deciding where and when to distribute BOMs. The data in this table works in coordination with the read-only Destinations table 224. If no distribution entries are made, distribution is assumed to be all to master databases 112 at various computer manufacturing facilities and all local databases and their associated servers 114 at those facilities.

Destinations Table 224

The Destinations table 224 is a master lookup table for all possible factory database server destinations. Distribution entries refer back to this table by associating to a particular BomKey.

The preceding tables define only the presently preferred embodiment. Of course, the relationships in the ERD could be modified to take account of different manufacturing needs or software distribution and installation needs or methods. Alternatively, the ERDs could manage distribution of only complete disk images. While this would significantly reduce DBMS overhead, it would result in increased distribution of duplicate components. The ERDs can also be modified to track each component separately (as its own SKU). While this can be done with the current ERD, a more narrowly defined ERD could be used. However, this would impact the end result of software installation by increasing the processing time and power required to install a complete system. Such a design would also defeat the "as-installed" character that the present ERD retains.

SKU Component Rules

SKUToBOM.Ordering Rules

Within SKU Components the SKUToBOM.Ordering field takes precedence over the BOM.SWType field. The only valid ordering that may be specified for Components is from 0 to (n−1) where n is the number of BOMs comprising the component. If BOMs within the component contain the same files, the file within the higher ordered BOM takes precedence over the lower ordered BOM. BOMs not contained in the same SKU component are treated according to the BOM.SWType rules for CTO builds.

BOM.SWType Rules

The BOM.SWType field is a bitmask. It is valid to combine masks within the field to better define a component. For BTF SKUs and SKU Components, the database verification routine, AUTOSKUV, will enforce the following rules:

Exactly one Master SKU Component per drive is allowed.
Zero or one Operating System may be specified per partition.

The download tools must enforce these rules for CTO Builds composed of multiple SKU Components. In addition to the above rules, the download tools will use the SKUToBOM.Ordering rules within a component.

In addition, SKU Components may NOT contain BOMs with a BOM.SWType value of 0. SKUs that consist of multiple BOMs may not include BOMs with BOM.SWType=0. These rules are required so that AUTOSKUV can determine those SKUs that are components. AUTOS-KUV will check non-component SKUs to ensure that only one partition per drive has Partition.SizeMB=0 (specifying the rest of the drive).

The ordering of components by the download tools will be described in more detail in an example on the next page.

Figure 15:
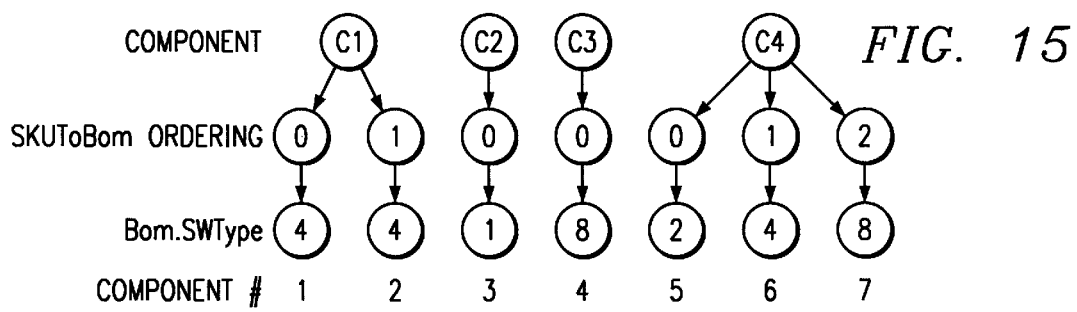
FIG. 15 shows a CTO build consisting of four SKU Components.

FIG. 15 shows a CTO build consisting of four SKU Components. In this example we have the following:

| Component # | Component | SWType | Ordering |
|---|---|---|---|
| 1 | C1 | Device Driver (4) | 0 |
| 2 | C1 | Device Driver (4) | 1 |
| 3 | C2 | Master SKU Component (1) | 0 |
| 4 | C3 | Application (8) | 0 |
| 5 | C4 | Operating System (2) | 0 |
| 6 | C4 | Device Driver (4) | 1 |
| 7 | C4 | Application (8) | 2 |

The Component # field above does not exist in the database but was added for the purposes of this example.

With the above data, the components will be installed in the following order:

| Component # | Component | SWType | Ordering |
|---|---|---|---|
| 3 | C2 | Master SKU Component (1) | 0 |
| 5 | C4 | Operating System (2) | 0 |
| 6 | C4 | Device Driver (4) | 1 |
| 7 | C4 | Application (8) | 2 |
| 1 | C1 | Device Driver (4) | 0 |
| 2 | C1 | Device Driver (4) | 1 |
| 4 | C3 | Application (8) | 0 |

Components C1 and C3 are installed in the order they are input into the download tools.

SKU Components

SKU Components were originally defined for Configure to Order (CTO) software images. Build to Order (BTO) and Build to Forecast (BTF) images may consist of SKU Components, however. This definition was provided to assist the software engineering groups and the computer manufacturing facilities in defining all software images the same way.

For SKU Components the information in the tables must be interpreted somewhat differently than for SKU Images. SKU Components are entered into the tables as SKU entries. A SKU Component may consist of any combination of software. It may define a partitioning scheme, a software application, or a set of software applications. SKU Components are handled differently for Build to Forecast/Build to Order and for Configure to Order. SKU values in the SKU table are currently assumed to be standard 6-3 part numbers. It is recommended that BOM ID values for SKU Components be the same value as the SKU number for the SKU Component. This follows that revision numbers and effective dates should be in synch.

BTF/BTO SKU Components
Build to Forecast/Build To Order

Figure 16:
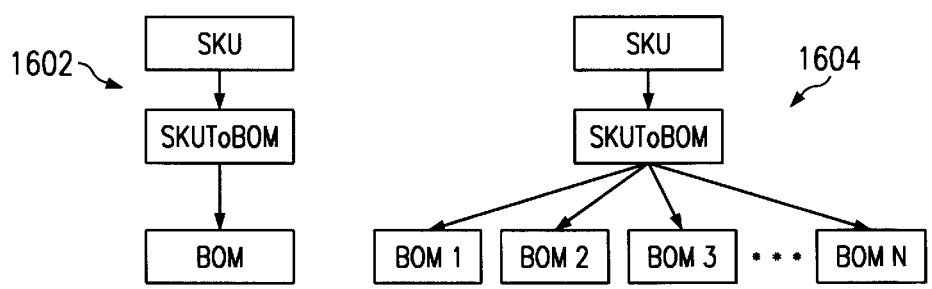
FIG. 16 illustrates standard BTF/BTO SKUs and BTF/BTO SKUs that consist of multiple SKU Components.

To allow Build to Forecast/Build to Order SKUs to consist of multiple SKU Components the SKUToBOM table points to multiple BOMs. FIG. 16 illustrates standard BTF/BTO SKUs 1602 and BTF/BTO SKUs 1604 that consist of multiple SKU Components:

Component Sequencing

Many times it is necessary to assure that components are applied to the hard drive in a specific sequence. To assure this occurs correctly, the SkuToBom tables Ordering field specifies the sequence components should be applied. This is used primarily for BTF/BTO SKU Images.

SKU Components, when entered into FIST on their own, should have a component ordering value of 0. Component ordering only has a meaning when multiple BOMs comprise a SKU Image.

Partitioning

Since SKU Components consist of multiple Partition tables, partitioning must be interpreted differently than for standard SKU Images. Partition information is submitted as the first deliverable for a SKU Image. This deliverable is referred to as the Master SKU Component and consists of the following information:

Drive partitioning scheme

Boot Sector for each partition

File system to be set up for the partition (FAT 12, FAT 16, FAT 32)

The Ordering in the SkuToBom table will always be zero for the Master SKU Component. If no partitioning information is provided, a Master SKU Component must be part of the SKU Image to build and must consist of all of the above listed information. If the partitioning scheme and file system specification are user defined, the Master SKU Component will only be interpreted to provide the boot sector for the file system. This requires that a user defined file system be mapped to the correct SKU Component containing the correct Boot Sector. The Master SKU Component must contain at least one file in the primary partition so the BOMSIZE and BOMMD5 fields are valid. Any files in the Master SKU Component are ignored, however, unless the Master SKU Component is combined with an OS/Application/Device Driver component.

The only partition information used for SKU Components defining deliverables are the Drive, Slot, and PhysicalOrder values. These indicate the drive and partition in which the deliverable is to reside.

Additional Table Data

For SKU Components the following table values are ignored, though they must contain valid keys for database integrity:

MBRDataKey in the BOM Table

DataKey in the Partition table (except SKU Component 0, the Master SKU Component)

CTO SKU Components

The CTO process is used in the building of machines to the specifications of individual customers. During the ordering process, a list of the SKU components necessary to build the customer's requested configuration is created. This list is stored in the software flow data management (or "SFDM") database. SFDM provides these stored lists to the PRISM database CTO builds consist solely of individual SKU Components. To handle this each SKU Component is queried individually and the download tools will build each Component individually. For Configure to Order, SKU Component sequencing is a more difficult problem to solve. Many times installation sequences depend on what other components are included in the build. FIST takes no responsibility for defining SKU Component sequencing in this case. The only information that FIST comprehends for component sequencing is the SW Type field in the BOM to determine if the component is a Master SKU Component, which defines drive partitioning, or if the component is the operating system. The Master SKU Component must be installed first and the operating system must be installed second. After that the other components may be installed in the sequence in which they are entered.

Partitioning

Partition information for CTO builds are provided through a Master SKU Component, the same as it is for BTO/BTF builds.

Additional Table Data

For SKU Components the following table values are ignored, though they must contain valid keys for database integrity:

MBRDataKey in the BOM Table
DataKey in the Partition table (except SKU Component 0, the Master SKU Component)

Miscellaneous Database Tables

The distribution process makes use of separate tables and SQL triggers particularly for replication, process logging, and tracking:

The HighestKey table is used to automatically generate new table primary key values when new table records are inserted. The table holds a single row which has a timestamp column.

The BlobsToTransfer table is populated by the QueueBlobTransfer trigger and used by the BLOb transfer (XFERBLOB) process. It holds a list of keys into the BLObject table for BLOBs whose data has not yet been transferred to the next server.

The UnCheckedBlobs table is used by the BLOb checking process after BLOb transfers are completed. It holds the same type of information as does the BlobsToTransfer table. It is processed by the BLOBMD5 process.

The BlobsToCheck table is used by the BLOb checking process if it is run with certain options. It has the same structure as the UnCheckedBlobs table. It is provided only on the master PRISM database.

The HistoryLog table provides a place to store general logging information for any system operations which have no other convenient place to log data. For example, it is used by the XFERBLOB, process to log BLOb transfer throughput rates and error conditions for later analysis.

The ChangesAuditLog table provides a place to store information regarding when changes are made to certain other tables within the database system. The table is used to record who makes certain key changes to the database, and the time that these changes were made. Rows are inserted into this table by triggers associated with INSERT, UPDATE, and DELETE operations on the following tables:

The SKU table is populated by triggers in the master isolation databases only.

The ReplTest table is provided as a place to put data in order to verify the correct setup of a DBMS Publisher/ Subscriber replication configuration. Since this table is part of the transaction publishing, dummy data inserted into this table should appear on all subscriber tables if replication is setup and functioning correctly.

The SKUQueue table is used by the FUNS on each single isolated database. The SkuIn and SkuUp triggers populate this table. The table serves as a queue of SKU records which need to be processed by the FUNS. This table only exists on the single isolated databases.

The SkuVerify table is populated by the SkuInsert trigger. It holds SkuToBom.SkuKey values which are to be processed by the AUTOSKUV process. It represents Sku's which have appeared on a server, but which have not been validated for internal record consistency as well as SKUs whose files have not yet arrived on the server.

The SkuOk table is populated by the AUTOSKUV process. It holds SkuToBom.SkuKey values for Sku's which have been successfully validated by the AUTOSKUV process.

The SkuFailed table is populated by the AUTOSKUV process. It holds SkuToBom.SkuKey values for Sku's which have failed validation by the AUTOSKUV.EXE program.

The SkusNeeded table defines the "Build Plan" for a given line server. That is, the SKUs which will be needed by a particular local server in its software installation process. The table is populated by the BPIM-PORT process. It holds Sku.SkuNumber values for SKU's which are to be verified by the AUTOSKUV process. It also defines which. BLOb Files are needed (based on SKU Numbers) at a line server if the server ever runs out of BLOb File space; the CLEANPFS process uses this table to decide which BLOb Files it can safely delete if needed.

The Log table is used by the software download processes to record various performance aspects of each download.

The LogMerged table exists only on the master PRISM database. It has the same structure as the Log table. It is used by the LOGXFER process and the MergeSiteMasterLogTables stored procedure to accumulate Log table data from all master site databases.

The LastTimeRan table is used by the CleanupOrphans stored procedure. The orphan clean-up process is potentially a very long-running process, so it is only run at certain time intervals (such as once every 2 weeks). This table holds the time it was last run so that future invocations may know if its time to process deletes again.

Database Triggers

A Primary Key Generation trigger mechanism is provided which will automatically generate primary key values (as binary(8) types) for all tables allowing INSERT privileges in the database specification. The INSERT triggers on these tables check that the INSERT value for the row's primary key is 0. If this check is passed, the trigger code uses the NewKeyValue stored procedure to generate a new key value guaranteed to be unique within the entire database. The result is used to UPDATE the inserted row's primary key column with the new value. Since this trigger mechanism increases the amount of data transferred via replication, triggers on the master PRISM database side also allow non-zero primary key values, if provided by the client. The client also has the ability to execute the key generation stored procedure. Keys are only generated if zeroes are provided in the key field during the INSERT step. This provides for a way to lessen replication data traffic.

The BomInsert trigger, an INSERT trigger attached to the Bom table, includes code to update the Bom.Revision value for the new row, if the row has the same BomID value as a row already in the table. It provides an automatic revision incrementing mechanism for easily inserting new versions of the same Bom. The trigger includes code to prevent linking to a master boot record (Bom.MBRDataKey) of size other than 512 bytes.

The SkuToBomIn INSERT trigger validates that a BOM being linked to has "valid" (non-zero) data in the referenced Bom.BomMD5, Bom.NumFilesInBom, Bom.DiCRC, Bom.PCRC, and Bom.Size fields. Attempts to insert a SkuToBom entry referencing a BOM with 0's in any of these columns is rejected.

The SkuIn INSERT trigger, attached to the Sku table, includes code to update the Sku.Revision value for the new row, if the row has the same SkuNumber value as a row already in the table. It provides an automatic revision incrementing mechanism for easily inserting new versions of the same Sku. Revision numbers are only incremented automatically if the supplied value is zero; if non-zero, the supplied value is left as-is, in order to allow it to be kept it in sync with the divisional source database if desired. In a single isolated database, this trigger also queues the Sku item into the SKUQueue table for processing by the merging/duplicate elimination process.

The SkuUp trigger is used in the single isolated databases. This UPDATE trigger on the Sku table queues the Sku item into the SKUQueue table for processing by the merging/duplicate elimination process.

The SkuInsertUpdate trigger copies a Sku.SkuKey value into the SkuVerify table during a SKU INSERT or UPDATE operation, if the referenced SKU's SkuNumber is in the SkusNeeded table. It is used to queue entries into the SkuVerify table which are to be processed by the AUTOSKUV process, for those SKU's in the current Build Plan (the SkusNeeded table). This trigger is only needed and used on the local databases.

The BomFileIn INSERT trigger on the BomFile table prevents BomFile rows from being associated with an existing Bom record if that Bom record's Bom.BomMD5 value has already been set. It helps to avoid accidentally adding a BomFile to an existing Bom, since doing so would invalidate the Bom's MD5 values. It also helps in the detection of corruption in the transfer mechanism. Refusal to change Bom records in this fashion simplifies the normalization process by avoiding the need for extensive searching and matching.

The QueueBlobTransfer INSERT trigger is attached to the BLObject table. When new rows are inserted, this trigger copies the DataKey value to the BlobsToTransfer table. This provides a simple queuing mechanism which can be used by the XFERBLOB.EXE program to cause BLOb files to be replicated across SQL Servers.

The DirEntryRI trigger includes code to prevent a DirEntry from being created whose DirEntry.DataKey value points to a BLObject that has not passed the MD5 checking step, sp_bfcheck (Blobject.IsChecked is 0x00). It includes a call to an extended stored procedure to check if the DirEntry.DosName portion appears to be a "valid" DOS file name. It also includes code to prevent duplicate row entries, since the row is too large to be covered by a UNIQUE constraint.

The DequeueBlobTransfer DELETE trigger is attached to the BLObject table. When rows are deleted, this trigger deletes any corresponding entry in the BlobsToTransfer and UncheckedBlobs tables, if present. It also deletes file server copies of BLOBs, if present.

The QueueBlobCheck DELETE trigger is attached to the BlobsToTransfer table. When rows are deleted, as occurs when XFERBLOB has completed a BLOb transfer, the XFERBLOB process creates an entry in the UncheckedBlobs table used by the BLOBMD5 process. BLOBMD5 processes these entries to verify that actual BLOb MD5 data matches the CRC values contained in the BLObject table.

Database Stored Procedures

Several procedures have been incorporated into the database to work in conjunction with the trigger code described above.

DoReplTest provides a simple mechanism to add a value to the ReplTest table on the master PRISM database for replication setup testing. It simply adds a new row to the ReplTest table. Since this table is part of the PRISM system replication, the new value should appear at all replication sites within a reasonable time period.

NewKeyValue provides much of the shared operations needed to generate new primary key values, using the primary key generation mechanism and HighestKey table described earlier. The procedure updates the single row in the HighestKey table, thereby forcing the row's timestamp value to be automatically updated by the SQL Server. This new value is then returned to the calling code (usually an INSERT trigger) for use as a unique primary key.

sp_bfcheck is used by the data input processes to the distribution databases (i.e. CIIT) in order to validate a particular BLObject file after the BLObject record has been written into the database. An INSERT trigger on BLObject rows is used to force the BlObject.IsChecked value to 0x00 (INSERT's with a non-0x00 value are rejected). A BLObject with an IsChecked value of 0x00 is considered "unusable", since it is not yet known if the database Blobject.MD5 value agrees with the actual BLOb File on the associated file system. Triggers on the DirEntry, Bom, and Partition tables reject any attempts to insert rows referencing BLObject's with BLObject. IsChecked of 0x00. The sp bfcheck procedure must be called to check the BLOb file's MD5 value and set the BLObject.IsChecked value to a non-zezo value, thereby allowing it to be used. The client program performing INSERT's on the BLObject table is expected to validate each BLObject row by calling sp_bfcheck, before attempting to reference it from another table. If a BLOb fails the check performed by sp_bfcheck, the failing BLObject row is automatically deleted by the sp_bfcheck procedure.

The CleanupOrphans procedure is used to accomplish old SKU deletion and orphan record clean-up. The procedure deletes all SkuToBom and SKU entries for SKU's with SKU.ExpirationDt greater than 14 days old. In addition, it checks for the last time it was, run (using the LastTimeRan table) and calls the DeleteOrphans stored procedure if it is time to run the orphan clean-up process again. This stored procedure exists only on the master PRISM database.

DeleteOrphans is called periodically by the CleanupOrphans procedure, and may also be invoked directly on demand. It deletes BomApps, Apps, BomFile, Bom, DirEntry, Partition, and BLOBject rows which are no longer referenced (directly or indirectly) by any SKU records. This stored procedure exists only on the master PRISM database.

DivDelSKUsCleanupOrphans is similar to the CleanupOrphans procedure, except that it is used only on a single isolated database. The procedure deletes all SkuToBom and SKU entries for SKU's with SKU.ExpirationDt greater than 14 days old. In addition, it calls the DivDeleteOrphans stored procedure to run the orphan clean-up process.

DivDeleteOrphans is essentially the same as the DeleteOrphans procedure, but is used on master isolation databases and their associated servers 108. It deletes BomApps, Apps, BomFile, Ghost Partitions, Bom, DirEntry, Partition, and BLOBject rows which are no longer referenced (directly or indirectly) by any SKU records. It is called by the DivDelSKUsCleanupOrphans procedure.

TotalFistRows is used by monitoring programs to provide, in a rough form, the progress of database replication across the different SQL Servers. The procedure retrieves the current number of rows in all the software distribution system tables and adds them to get a total row count. (It also includes the count of rows in the ReplTest table, as a quick aid in testing a new replication set-up.) The procedure returns this total value and also produces it as query-able output. These row counts may then be compared to get an idea of how much more SQL replication needs to execute before two SQL servers are synchronized.

xp_prism_formatdatakey is an extended stored procedure contained in the SQLPRISM.DLL. It is used by the sp_bfcheck procedure to format a BLObject.DataKey value into a text string.

xp_prism_runtrustedprogram is an extended stored procedure contained in the SQLPRISM.DLL. The purpose of this procedure is to provide a more "trusted" mechanism to run programs from within SQL triggers and stored procedures, when compared to the xp_cmdshell stored procedure. It is currently used by the sp_bfcheck stored procedure to run the BLOBMD5 process to perform a BLObject.MD5 check. The procedure checks for a known ProgramPath name, looking for a known program portion of the full path. If a known program name is provided, the procedure formats a command string and runs the program. The stored procedure returns the program's exit code value if the program was started successfully. It returns −1 if the program could not be: started, if the program is not a known program. A return value is set to a string representing the formatted command, with an exit code value.

xp_prism_isfilenamevalid is an extended stored procedure contained in the SQLPRISM.DLL. It is used by the DirEntry INSERT trigger to check if a given DirEntry.DosName is a "valid" DOS file name. The current implementation checks for file name portion greater than 8 bytes and extension portion greater than 3 bytes. A return value of 0 in @Rc indicates that the DosName was determined to be valid. A. non-zero value indicates it was not valid.

QueueSkuBlobCheck is used to double-check the BLC)b File status for a given SKU. The procedure determines the set of BLObject.DataKey's referenced by the specified SKU.SkuNumber, and queues the DataKey's into the UnCheckedBlobs table for checking. The BLOBMD5 process reads this queue and requeues the BLOb Files for retransfer.

MergeSiteMasterLogTables is used on the master PRISM database server to gather Log table data from all site master servers into the LogMerged table on the master PRISM database. The LOGXFER procedure deletes all contents in the LogMerged table on the master PRISM database, and then copies Log table data from each site master server. This procedure is intended to be run periodically by the SQL Executive.

NetUseBlobFileSource issues a "NET USE N: \\<servername >\data" command to setup the N: drive to the source for BLOb File transfers if the N: drive currently doesn't exist, as in when the server machine has been restarted. It is intended to be configured as a start-up SQL Server procedure (using the sp_makestartup procedure) so that the N: drive is available by the time the BLOb File transfers start. This setup assumes that the source machine and share name are available at the time NetUseBlobFileSource runs. If the "ET USE" fails, then the N: drive will not be available, and the XFERBLOB process will fail. Since the procedure does nothing if an N: drive already exists, this procedure may be safely scheduled to run at regular intervals in order to reestablish lost connections, if necessary.

GetTableNumbers provides a way to get row counts from most of the tables in any software distribution system database. It also performs the join and SUMO functions needed to determine the size (MB) of BLOb Files in the system (Blobject table), waiting to be transferred (BlobsToTransfer), or waiting to be checked (UncheckedBlobs). The procedure is used by the SRVRST2 program.

ReplLog provides a convenient way to log the progress of BLOb transfer and checking. It is intended to be invoked periodically by the tasks set-up with the SQL Server Task Scheduler. It collects various record count and total size values into a single record and inserts a row into the HistoryLog table. Viewing these records as they are produced over time gives a view of BLOb file transfer progress.

Introduction of Software to the Distribution System

Figure 3A:
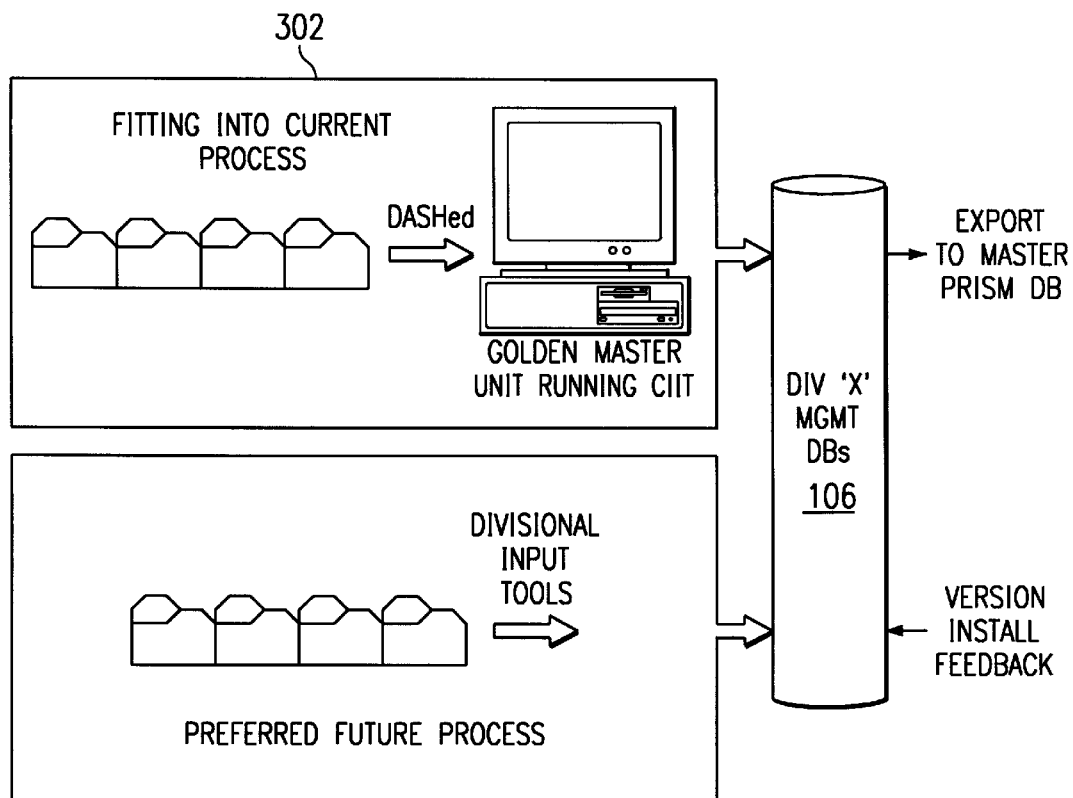
FIG. 3A shows a block diagram of the method by which software may be released into the novel computer manufacturing software download distribution system.

Data management structures used by a software engineering group do not need to conform to this ERD. However, once SKU numbers are assigned to images ready to be released, each must be unique. FIG. 3A illustrates, in block diagram form, two methods by which software may be released by software engineering groups into the software distribution system in a manner conforming to the ERDs described above.

CIIT

The first method 302 is via the Consolidated Image Importer Tool (CIIT), a utility that can be used by a software engineering group to "check" software into the group's database 106. CIIT is run on a machine known as a "golden master" which contains "installed" versions of the software to be released to the software distribution system by the software engineering group. CIIT will import every file from the "golden master", including the boot sector, partition, and all directory information, into the engineering entity's database. Any duplicate files are eliminated during the import process. To organize the production files for database entry, the software versions are grouped together as a Stock Keeping Unit (SKU)/Bill of Materials (BOM) combination. The SKU identifies the CPU, the primary hard disk, the country/keyboard, and whether software will be pre-installed in the factory during manufacture. A BOM is a list of the software files which will be copied to a computer during factory software pre-installation. A BOM is the identifier used to recall a specific disk image and is used by a software engineering group for tracking the image. The disk image referenced by the BOM represents what the engineering entity wants the customer to see when he or she boots their computer for the first time. Both the SKU and BOM are used by the software download database and the software download process (GEMINI) to ensure that all necessary software will be downloaded at the computer manufacturing facility's software pre-install.

CIIT is normally run automatically from a Windows; 95 boot diskette which is booted on an example target 'golden master' machine containing software versions which should be grouped together logically as a Stock Keeping Unit (SKU) and Bill of Materials (BOM) combination. The 'booting from diskette' concept allows CIIT to run in a predictable and unrestrained environment, under DOS, regardless of what operating system, TSRs, drivers or applications which may be installed on the golden master. Thus, CIIT can completely scan the hard disk and log into a database its file system type, partition information, boot sector, directories and finally the actual files themselves. This storage scheme also lowers the amount of disk space needed as multiple BOMs can reference the same file, eliminating the need for duplication. The table structures that CIIT is designed to support completely normalize the data, eliminating any duplicates. If files are found on the example machine which already exist on the database, only the table entries necessary to catalog its necessity are made. Since the file data already exist, there is no necessity to duplicate it.

The second method 304 is meant to take advantage of CIIT's ability to break down disk images as components, however, it is designed to do so on a smaller scale. Instead of describing an entire disk image in terms of components, this method works on particular files or groups of files which must be installed together. These can include the operating system and its associated files, an application and its supporting utilities, or even a stand alone TSR.

The ERDs described above for the preferred embodiment are only one way of representing the data needed to distribute and install the software. Both the ERDs and CIIT can be altered according to the needs of the distribution system. CIIT is merely a vehicle for breaking the disk image of a hard drive down into its component parts. Once the component parts have been identified, information concerning them can be inserted into a software distribution database in many different forms.

As in the alternatives for ERDs, CIIT can also alternatively be configured to store entire disk images without a file by file break down. In a further alternative, CIIT can be configured to store each file on the golden master as a separate SKU which can be stored and downloaded on its own. Of course, any range of component break down between these two examples can also be achieved.

Alternatively, it is important to note that individual software files can be placed into the database tables without the aid of a software process. As long as a database model exists which allows identification of the components, the database can be populated with information concerning them by humanly human entries via keyboard or other input devices.

Figure 3B:
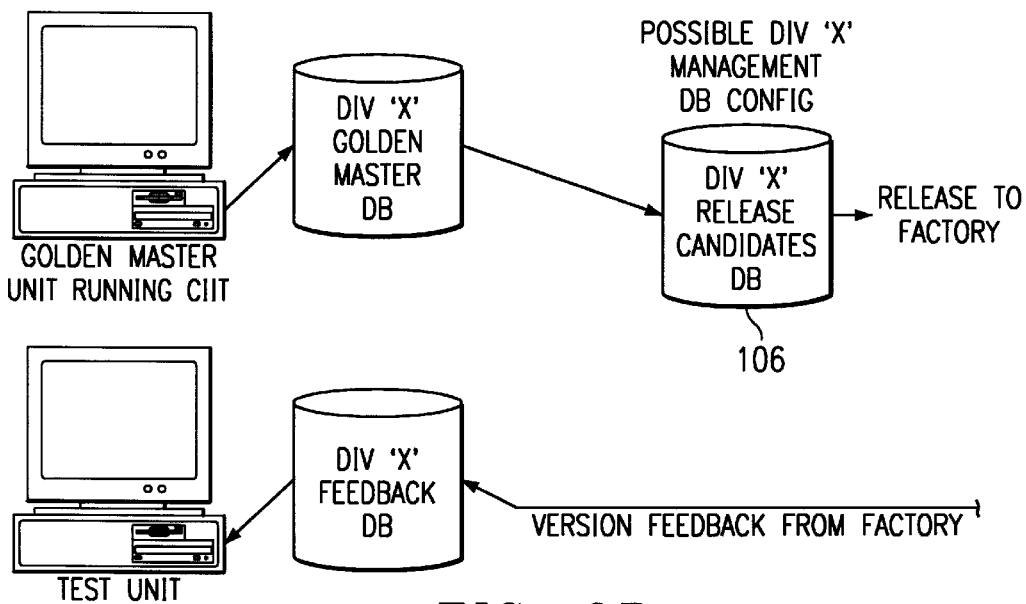
FIG. 3B shows a block diagram of the method by which software may be released into the novel computer manufacturing software download distribution system.
Figure 4A:
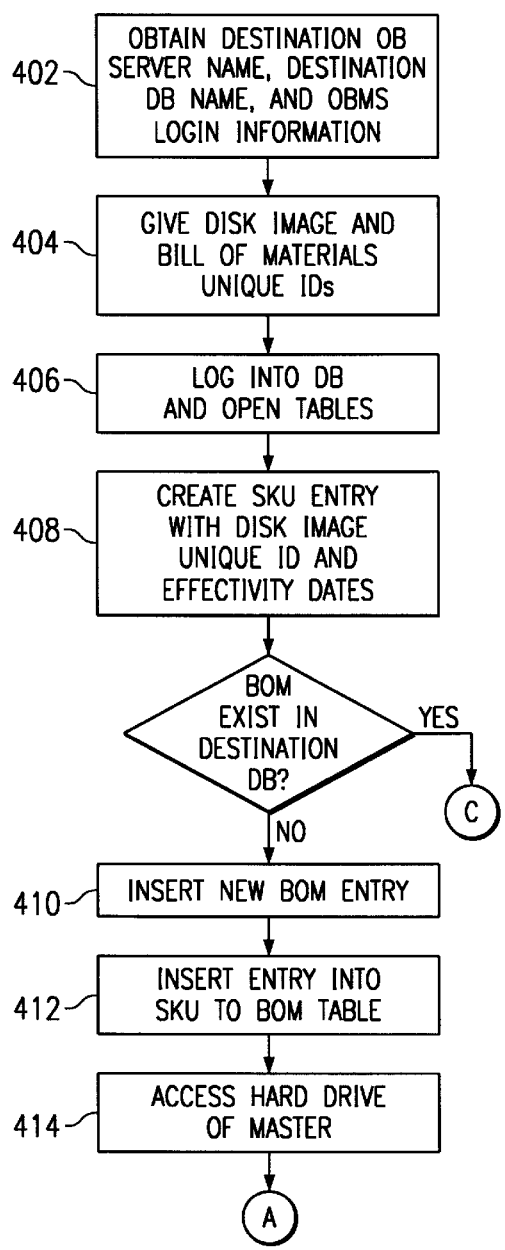
FIGS. 4A–D show a flow chart of the process by which software is released into the novel computer manufacturing software download distribution system.
Figure 4B:
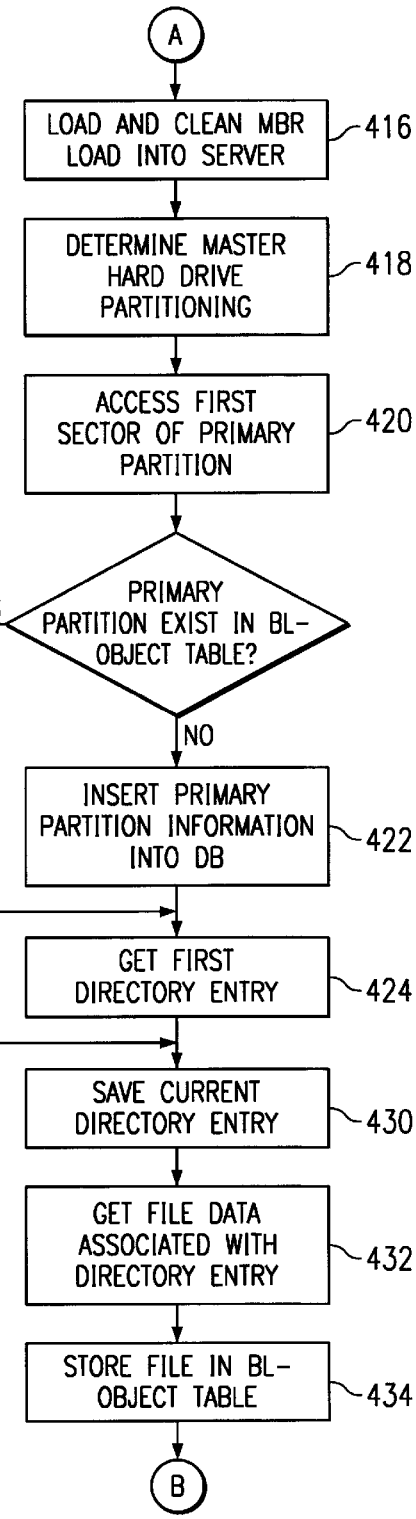
Figure 4C:
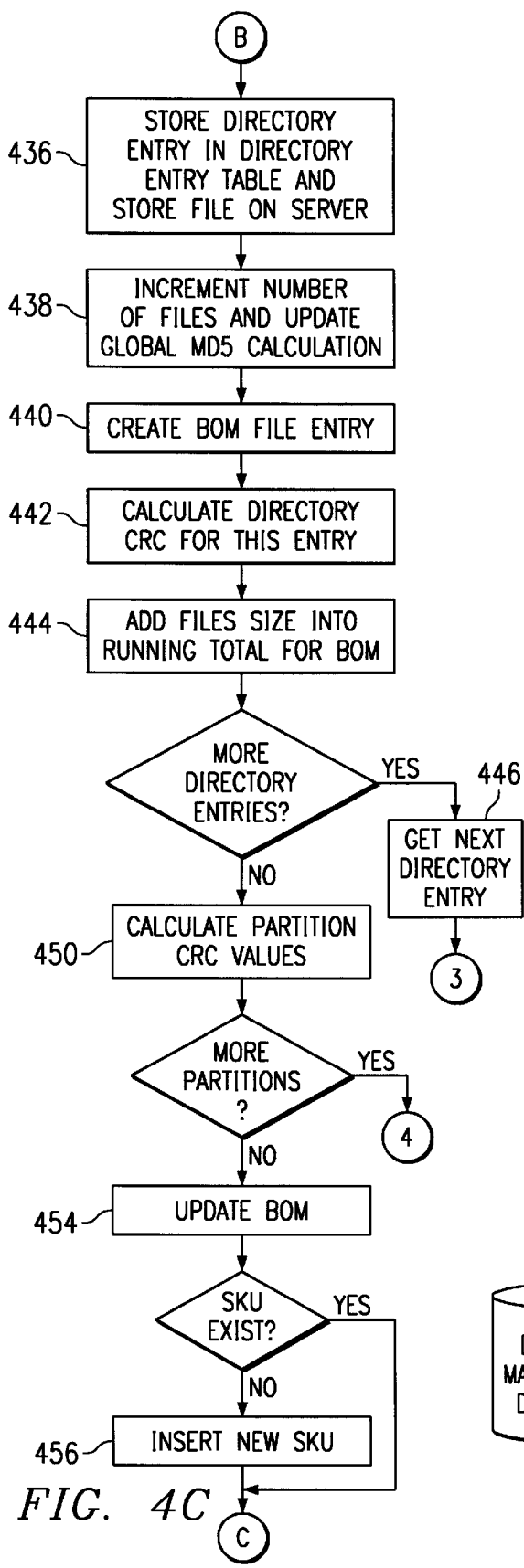
Figure 4D:
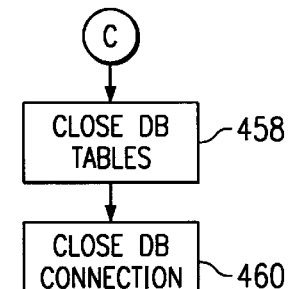

The database in FIG. 3A is merely symbolic in that it represents only the management of data. FIG. 3B represents a data management structure that provides a clear demarcation between files that are merely being stored by a software engineering group and those ready to be released to the software distribution system. The files may be stored in a variety of ways including conforming to the ERDs above. If only one database will used by a software engineering group to manage files, the release of the files must be gated somehow, possibly with a data element, in order to control their release into the software distribution system.

Sample CIIT Program Flow

Following is a summary of the algorithm used by CIIT to populate the management databases and associated servers 106 with the as-installed information of the golden master machine. The operation of this algorithm is also shown schematically in FIG. 4.

CIIT first obtains the name of the database server on which the database to be populated resides (SQL server name), the name of the database to be populated (database name), and DBMS login information (user name and login) (step 402). This information is usually kept in file with the CIIT program as it changes infrequently. Next, the disk image and its bill of materials must be given unique identifiers (step 404). The unique identifier combination is in the form of a SKU and BOM. These identifiers can be entered at runtime or supplied by a separate file. If multiple software engineering groups use the software distribution system, some form of cross-group communication must take place to ensure unique identifiers are used for each disk image. Next, the CIIT process must log in to the database and open the tables it will be using to store the disk image information (step 406). Next, a SKU entry is prepared with default Effectivity and Expiration dates (step 408) A new entry is then inserted into the BOM table 206 (if it does not already exist) (revision counter automatically increments) (step 410). Next, an entry is built and inserted (using primary keys from both above tables) into the SkuToBom table 204 (step 412). Next the hard drive of the unit on which CIIT is executing is opened (step 414). The MBR is then loaded into the server (step 416). Next, the first sector of drive is accessed and the drive's partitioning is determined (step 418). Then, the first sector of the primary partition is accessed and inserted into the BLObject table 214 (if it does not already exist) (step 420). Next, an entry containing partition information is built and inserted into the database using the primary key from the above insertion into the BLObject table 214 (if it does not already exist) (step 422). At this point in the process, for each partition on the drive and directory entry in the partition the same procedure is followed:

Temporarily save current directory entry (step 430)

Follow directory entry to its file data (step 432)

Store the file data into BLObject table 214 (along with calculated MD5 values and total file size also) (step 434)

Store the directory entry into the DirEntry 212 table using the primary key from the above insertion into the BLObject table 214 (step 436), and store the file on the server Increment number of files and update the global MD5 calculation (step 438)

Create BomFile entry using the primary keys from the above insertions into the DirEntry 212, Partition 210, and BOM tables 206 (step 440)

Calculate directory CRC for this entry (step 442)

Add this file's size into running total for BOM (step 444)

Calculate partition CRC value (step 450)

The BOM entry is then updated with global BLOB, Direntry and Partition CRCs, number of files and BOM size in bytes (step 454). A new entry in the SKU table is inserted 202 (if it does not already exist) (revision counter automatically increments) (step 456). The process completes by closing the open database tables (step 458) and closing its database connection (step 460).

Again, the use of CIIT for entry of released files; into a software engineering group's database 106 conforming to the above ERDs is not a necessity. Even though CIIT only adds new files and new versions of files that have changed, it still must scan each file on the golden master and go through a process to eliminate any duplicates. Alternatively, a software engineering group could use a set of check-in tools which would allow file-by-file check-in/update to its database 106 without having to process the entire set of files for the whole BOM. However, any input tool used by a software engineering group will have to, at some point prior to releasing the files, conform them to whatever database structure which is used by the software distribution system.

Distribution of Software Files

As described above, software files will not exist as BLOBs within any database table. Rather, BLObject records will exist with NULL BLOb-ject. FileData columns, and a BLOb File naming convention based on BLObject.DataKey values will be used to associate the BLObject records to their associated BLOb files. Of course, the DBMS BLOb data type can be used to manage the software releases with their associated data. However, the amount of overhead consumed by the table structures and the DBMS in managing such data types makes the use of this feature undesirable at this time. Alternatively, as new data types become available the table structure can be altered, if need be, to take advantage of more efficient data management methods.

Data replicated to the distribution server 120 will use SQL 6.0 methods, and therefore will not distribute actual BLOb data. The BLOB files are stored using a directory tree and file naming convention based on the BLObject table primary key values, thus guaranteeing unique file names on this file system from a certain directory level onward. File system areas for each division are configured such that BLOb files may be placed within the designated directory, but may not be altered after being created, thus providing a level of protection from unwanted modifications. However, extraneous files or those no longer needed can be deleted. This scheme allows a greater potential for file system and database synchronization problems, but the simplicity and speed benefits are currently believed to outweigh any potential for problems.

Isolation of Released Data

Figure 5:
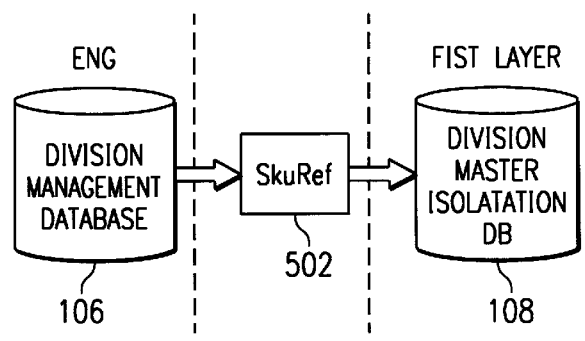
FIG. 5 shows a block diagram of the method by which released software is transferred to the first layer of the novel computer manufacturing software download distribution system.
Figure 6A:
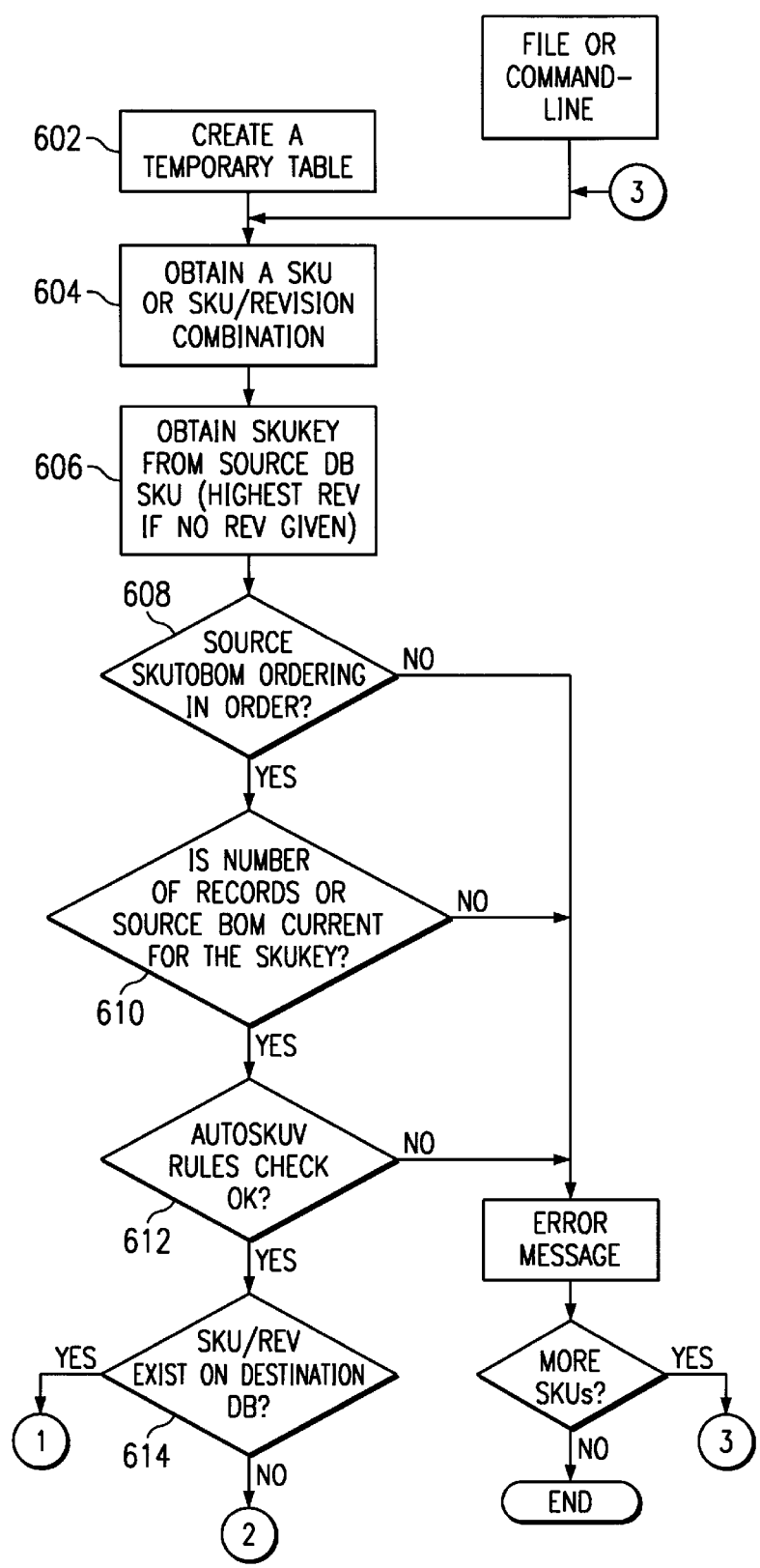
FIGS. 6A–D show a flow chart of the process by which released software is transferred to the first layer of PRISM.
Figure 6B:
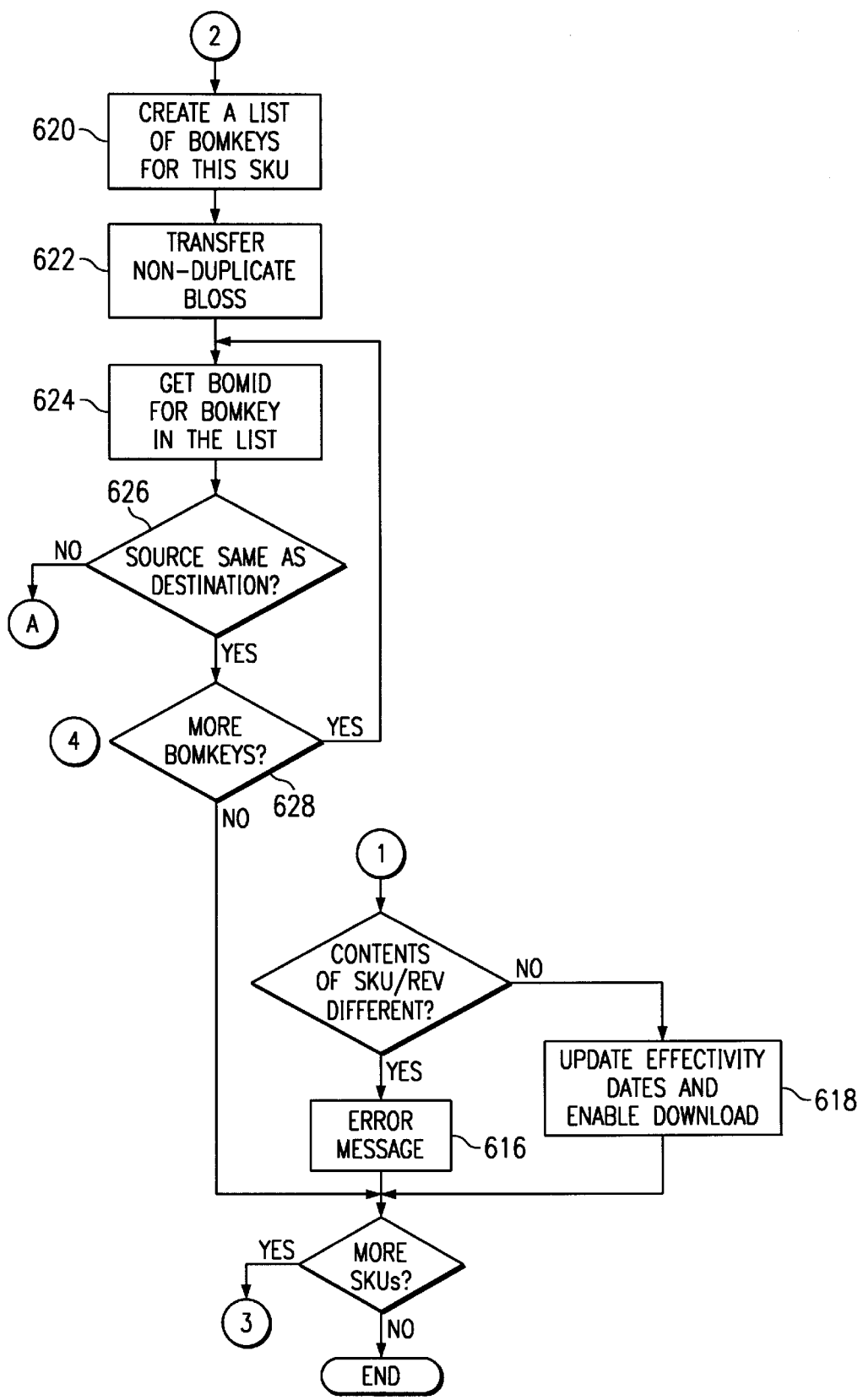
Figure 6C:
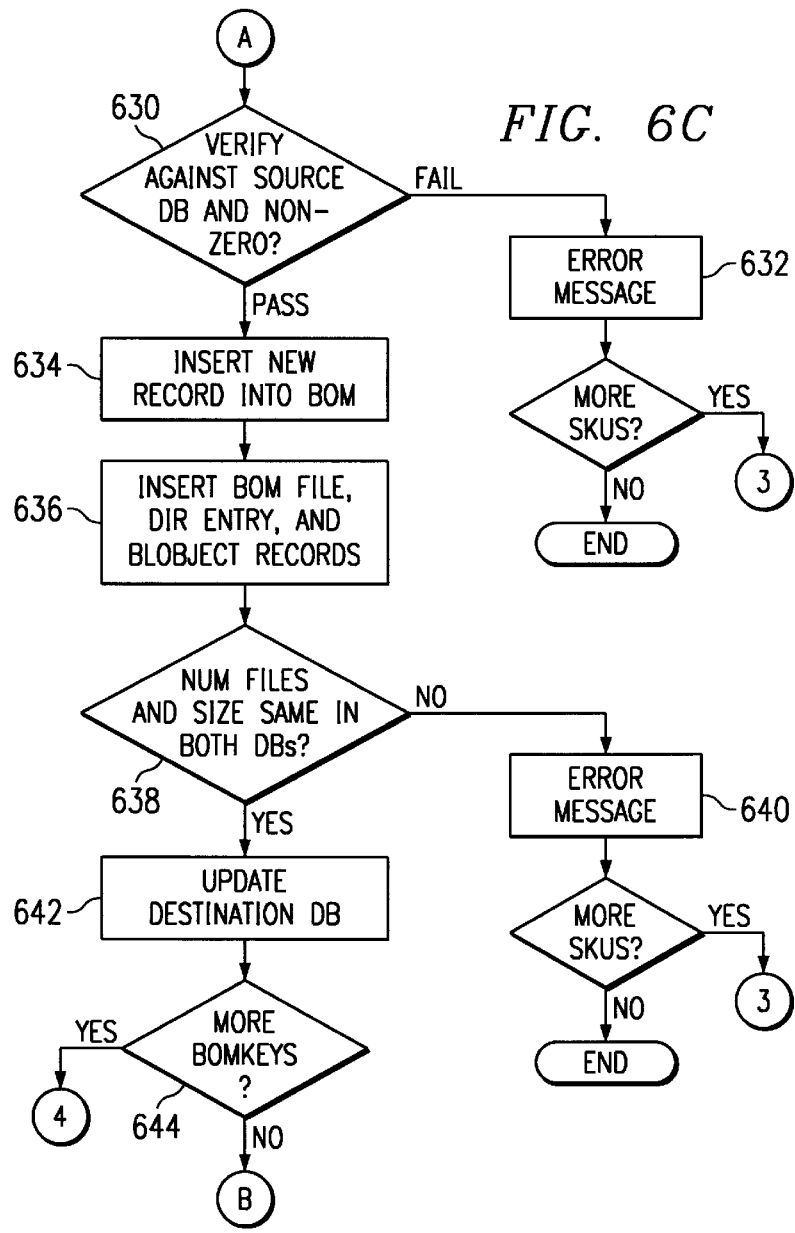
Figure 6D:
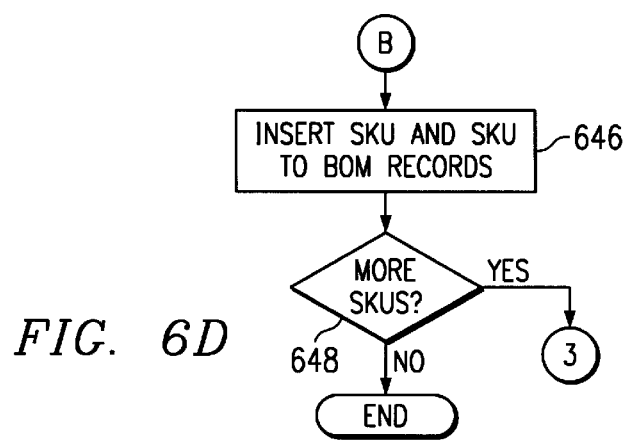

FIG. 5 illustrates in a block diagram the process by which software released by an engineering group into its management database and server 106 is transferred to a single isolated database and server 108. SKURel 502 is process used to transfer files released by a software engineering group and their associated database records to the software distribution system.

Following is a summary of the algorithm used by SKURel to effect the transfer of files released by a software engineering group and their associated database records to the software engineering group's master isolation database and server. The operation of this algorithm is also shown schematically in FIG. 6.

The SKURel program processes by a given SKU number or SKU number/Revision combination. This information can be supplied at run time via a command switch or input file. SKURel verifies the source database, compares target Boms with source, and checks to see if BLOb files already exist before it proceeds to transfer BLOb files and database records to destination server. It is important to note that once a BOM has been entered in the database, it cannot be modified. This allows the detection of new source data to be greatly simplified.

Processes command line (step 602).

Prepares temporary table to make sure that only one instance of SKURel exists for one destination.

Sku Number or a set of Sku Number and Revision is obtained from the command line or input text file (step 604).

Gets SkuKey from source SKU. SkuKey with highest revision is queried from source SKU if the revision number is not part of the input (step 606).

Checks the source SKUTOBOM to make sure that SKUTOBOM.Ordering is in order. An error message will be displayed and next SKU is processed if the ordering is skipped or is duplicated (step 608).

Checks source BOM for correct number of records for the SkuKey (step 610).

Checks BOM.SWType to make sure it conforms with the rules set up for AUTOSKUV (step 612). The rules are as follows:

SKUs with multiple boms can not have BOM.SWType with zero value.

SKUs must not have more than one Operating System (BOM.SWType=2) in any single partition. Or they may contain no Operating System.

Only one Master SKU Component (BOM.SWType set to 1 or 0) is allowed for SKUs. But SKUs are not necessary to have Master SKU Component.

If BOM.SWType is set to 0 or 1, there must be no more than one partition with a Partition.SizeMB:=0.

If Master SKU Component (BOM.SWType set to 1 or 0) exits and its Bom partition is queried in ascending Partition. PhysicalOrder, the Partition.SizeMB of value zero must appear at the end if the Bom contains the Partition. SizeMB of value zero.

Calculated source BLOb files size must be the same as the BOM.Size for the bom.

Total number of bom files for the bom must be the same as BOM.NumFilesInBom.

All calculated MD5, DirCrc, and PCRC must be the same as BOM.BomMD5, BOM.DirCRC, and BOM.PCRC, respectively.

Checks destination to see if SkuNumber and Revision exists (step 614).

If exists, compares contents of BomKeys in destination with source.

If contents are the different (step 616), display error message and process next sku entry. If contents are the same (step 618), update EffectiveDt, ExpirationDt, and EnDnld in target SKU and process next sku entry.

If SkuNumber and Revision do not exist in destination:
1. store all BomKeys for the SkuKey in a list (step 620).
2. transfer all non-duplicate BLOb files associated with the sku to the target server (step 622).

In order to make sure that the BLOb files are not duplicated on destination server, SKURel queries target BLOBJECT table for MD5 and Sizes. If the BLOb exists, the BLOBJECT.DataKey is reused in other tables. A new data key is generated and the BLOb file is copied to target server only if the BLOb is not in the destination. This process is repeated until all BLOb files associated with the born are processed. During this process, SKURel sums up MD5 and Size of all BLOb files. The calculated values are then compared with BOM.BomMD5 and BOM.Size after processing all BLOb files. If the values compare correctly, the target BOM is updated, and target SKUTOBOM and SKU tables are inserted with new records. Otherwise a failure occurs and an exception is raised.

Gets BomID for a BomKey in the list (step 624).

Check if BomID in destination database is the same as the one in source by querying for BomID, Division, and Revision and comparing NumFilesInBom, DirCRC, PCRC, and Size in destination with source (step 626). If it compares, repeat to process next BomKey in the list (step 628). Otherwise an exception is raised.

If NumFilesInBom, DirCRC, PCRC, and Size are zeros for a BomKey on target server (step 630), an error message is displayed and the next sku entry is processed (step 632).

If NumFilesInBom, DirCRC, PCRC, and Size are not zeros but are different from the ones on source server (step 630), an error message is displayed and the next sku entry is processed (step 632)

Verifies NumFilesInBom, bomSize, bomMD5, dirCRC, and Partition CRC in source database (step 630). If verification fails, an error message is displayed and the program processes the next sku entry (step 632).

A new record with zeros in NumFilesInBom, Dircrc, Pcrc, and Size fields is inserted into target BOM (step 634).

Processes BOMFILE, DIRENTRY, and BLOBJECT tables. Generates new keys and inserts new records into the tables if necessary (step 636).

Compares NumFilesInBom and Size in destination database with the ones in source (step 638). If it fails to compare, an error message is displayed and the next sku entry is processed (step 640).

Updates NumFilesInBom, Dircrc, Pcrc, and Size in target BOM (step 642).

Repeats until all BomKeys in the list are processed (step 644).

Starts database transaction.

Inserts a new record into SKU (step 646).

Inserts new records into SKUTOBOM (step 646).

Stops database transaction with a "Commit".

Gets next sku from input file and repeats (step 648).

Removes Temporary table.

Using SKURel as the vehicle for introducing released files allows any duplicate files which may have existed in the software engineering group's database to be eliminated prior to being replicated throughout the software distribution system. Further, allowing a process to handle the actual transfer adds a verification layer and ensures that all needed data is input into the table in the proper formats.

Merging of Isolated Data

Figure 7A:
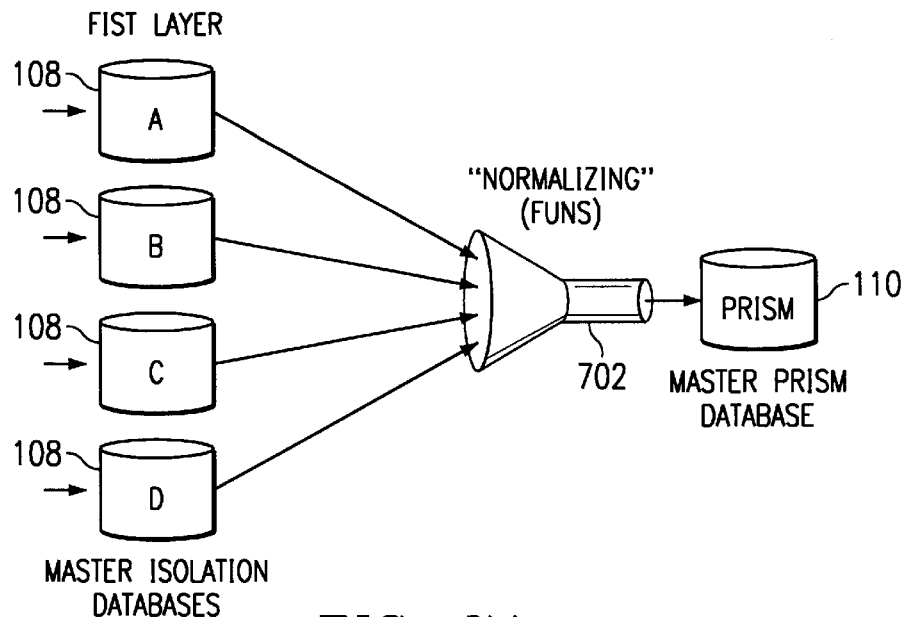
FIG. 7A shows a block diagram of the information flow by which released software in the first layer of the novel computer manufacturing software download distribution system to the master isolated database and server.

FIG. 7A represents in block-diagram form the data flow associated with the merging of database and server information from the master isolation databases 108 into the master PRISM database 110. FUNS 702 is the merging and duplicate elimination process which is responsible for this transfer. The merging/duplicate elimination process maintains cross-table relationships between each software engineering group's master isolation database 108. Since duplicate records will not be allowed, the data cannot merely be copied from each master isolation database 108 to the master PRISM database 110. Neither would it be efficient: to perform such a copy as not all SKUs need to be transferred each time FUNS 702 executes. The basic operation of FUNS 702 is as follows:

Command line arguments passed to the FUNS 702 process specify which two databases are to be used as the source and destination databases, respectively. INSERT and UPDATE triggers exists on. the SKU table. Whenever a new SKU is inserted or a change is made to an existing SKU, these triggers copy the SKU.SkuKey from the new/changed row into another table called SKUQueue. This secondary table serves as a holding place for SKU's which need to be processed by the FUNS program. A batch file is used to start each command line in sequence, so that only a single instance of the FUNS 702 process is running at any point in time.

Figure 7B:
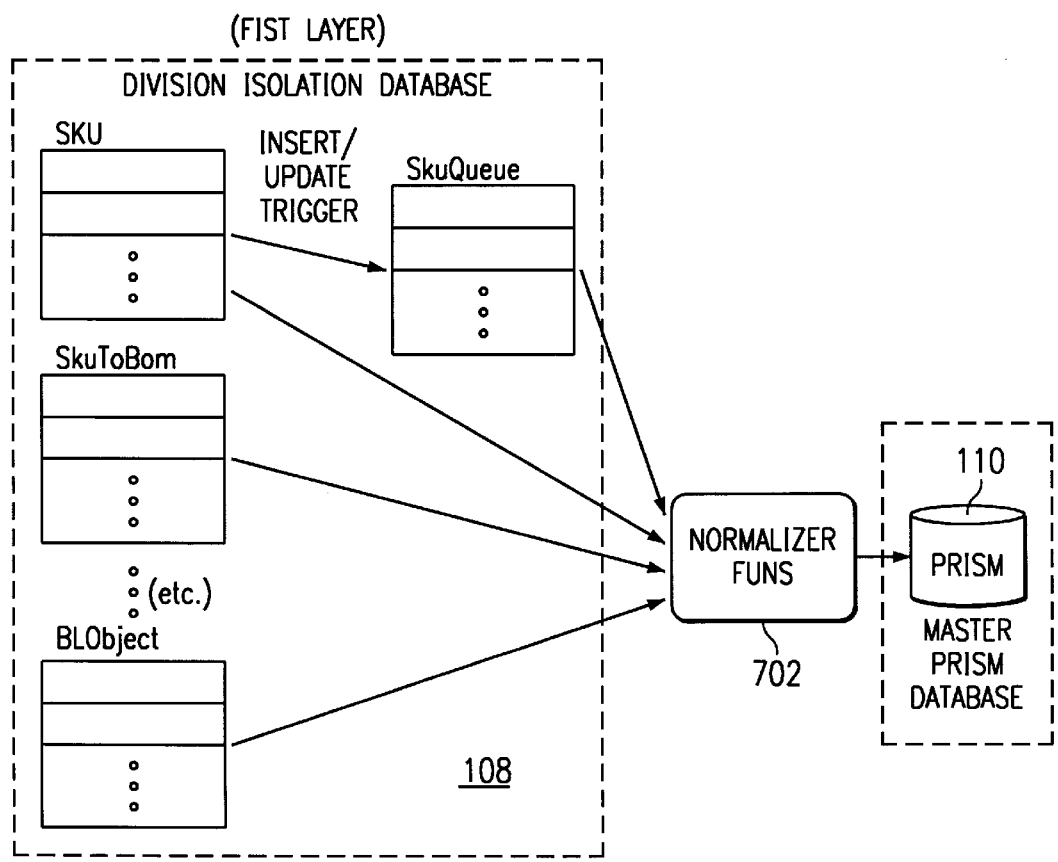
FIG. 7B shows a block diagram of the method by which released software in the first layer of the novel computer manufacturing software download distribution system to the master isolated database and server.

Alternatively, FUNS 702 can be initiated manually at any time. FIG. 7B illustrates the datastructures used by FUNS 702 . When FUNS 702 executes, it looks for items in the SKUQueue table. For each item found, it compares the "contents" of the specific SKU with the contents of the master PRISM database 110. FUNS 702 adds any files (BLOBs) and other records and relationships which exist in the single isolated database 108, but which do not yet exist on the master PRISM database 110. FUNS 702 is run once for each single isolated database 108, eliminating duplicates and merging information from a particular source database 108 in each run. FUNS 702 removes items from the SKUQueue table as it processes them. The program processes as many SKUQueue entries found in a single invocation.

Figure 8A:
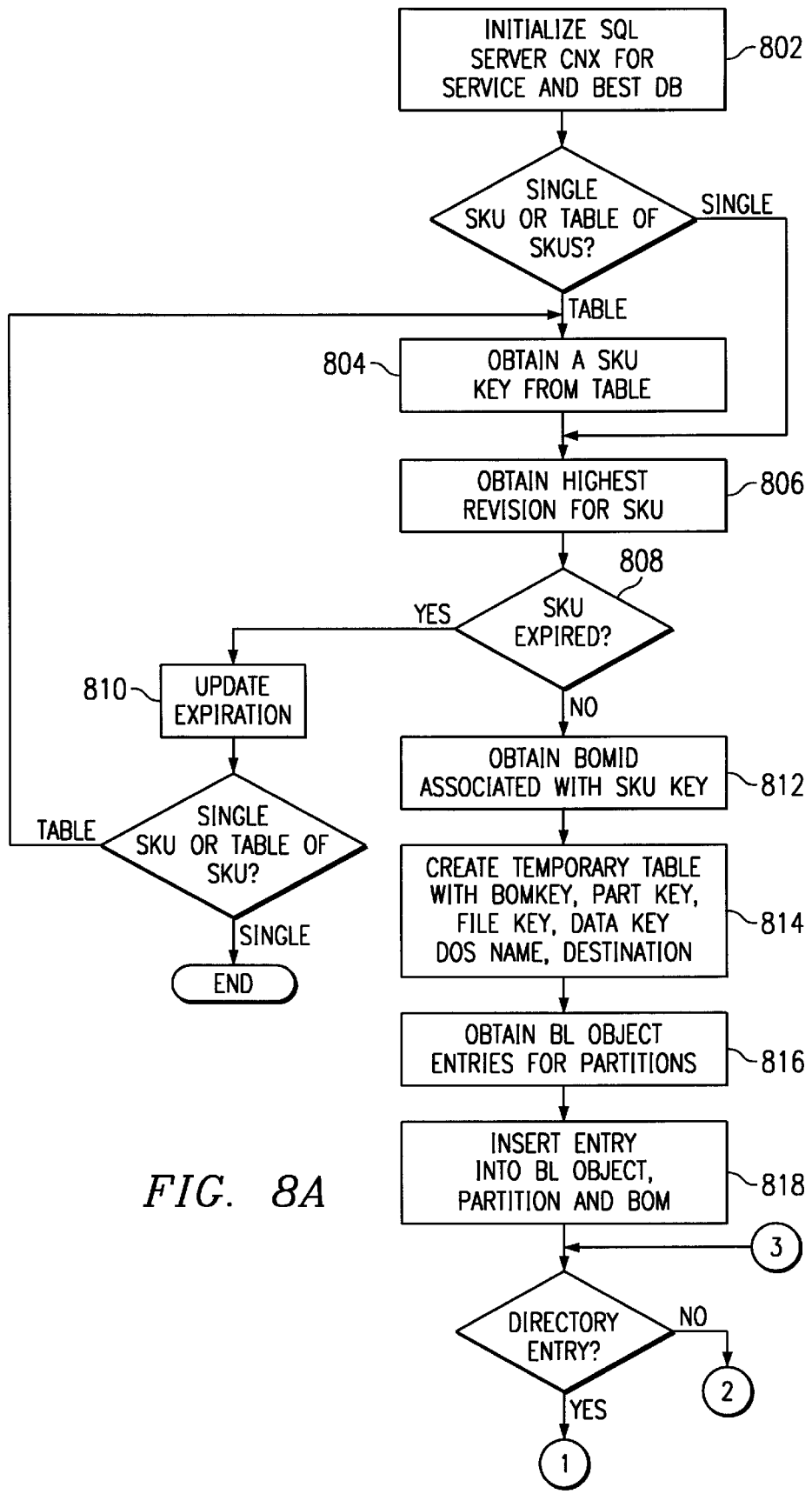
FIGS. 8A–B show a flow chart of the process by which released software in the first layer of the novel computer manufacturing software download distribution system to the master isolated database and server.
Figure 8B:
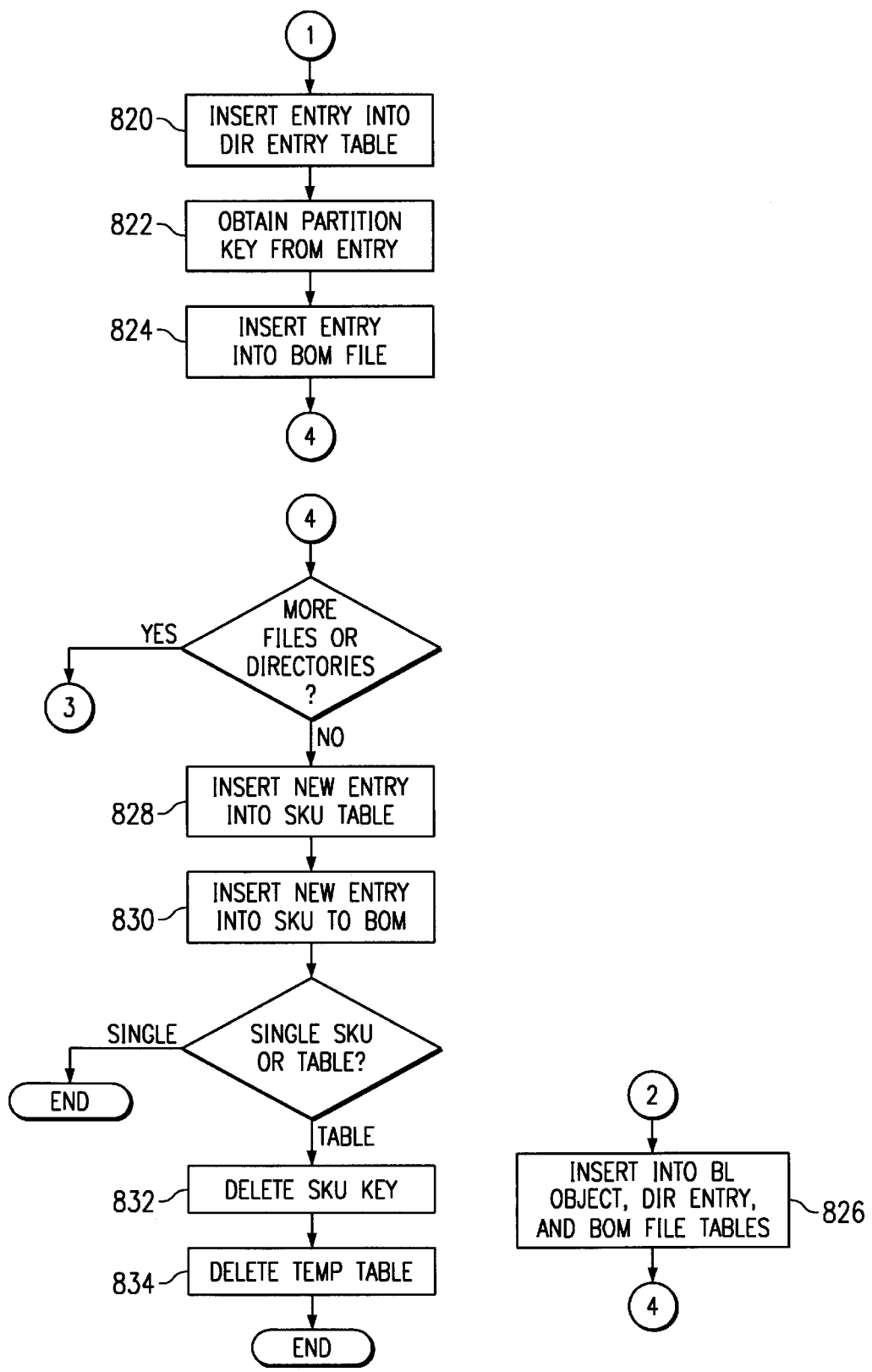

FIG. 8 illustrates the flow of an execution of FUNS 702 in.pseudo-code form.

```
Parse the command line for Source Server Name, UserId,
    Database Name . . .
Initialize SQL Server Connection for both source and
    destination servers (step 802).
If (Table Option)
    ProcessMultipleSku ()
Else
    ProcessSingleSku ()
ProcessMultipleSku ()
{
    GetASkuKey () (step 804)
    ProcessSingleSku ()
    DeleteASkuKey () (step 832)
    DropTempTable () (step 834)
}
ProcessSingleSku ()
{
    GetHighestRevision - if the sku option is set (step
        806).
    Check for Expiration date - If the sku is expired
        (step 808).
    {
        Update Expiration Date field (step 810)
        Return
    }
    Get BomId associates with the assigned SkuKey (step
        812)
    Create Temp Table (step 814)
    Insert into temp table (BomKey, PartKey, FileKey,
        DataKey, DosName, Destination) (step 814)
    Get Partition Blobs (step 816)
    If not at least one partition BLOb found then
        Return
    Insert new entry into BLObject table (step 818)
    Insert new entry into Partition table (step 818)
    Insert new entry to Bom table (step 818)
    do
    {   If (isDir)
            ProcessDirBlobject ()
        Else
            ProcessFileBlobject ()
    }   while (NO MORE FILE or DIRECTORY)
    Insert new entry into SKU table (step 828)
    Insert new entry into SKUTOBOM table (step 830)
}
ProcessDirBlobject ()
{
    Insert into DIRENTRY table (step 820)
    Get Partition key for the above dirEntry (step 822)
    Insert into BomFile using the primary key from
        DirEntry, Partition, and Bom tables (step 824)
}
ProcessFileBlobject ()
{
    Insert into BLOBJECT table (step 826)
    Insert into DIRENTRY table (step 826)
    Insert into BOMFILE using the primary key from
        DirEntry, Partition, and Bom tables (step 826)
}
```

Distribution of Software to Computer Manufacturing Facilities

Once the software releases and their associated database entries have been placed on the master PRISM database 110, a replication process becomes responsible for their transfer to the various computer manufacturing and test facilities and their associated local databases and servers. A separate distribution server 120 can be used to "publish" the released information to the manufacturing sites. Although most database schemes, particularly SQL, are equipped to replicate their contents between like structures, since the released files are not kept as BLOBs within the database, a separate process must be used to ensure the replication of the software releases themselves.

As described above, the FUNS 702 process is responsible for populating the master PRISM database. Once data is entered into the master PRISM server 110, the DBMS replication process takes over to distribute this data to the various computer manufacturing and test facilities and their associated local databases and servers. All tables defined in the software distribution system specification are replicated to these servers.

The basic replication scheme makes use of the existing replication capabilities provided by Microsoft SQL Server 6.0 to the extent possible. Transaction-based replication is configured on all of the database tables, so that any changes to these tables are replicated to other servers around the world. The master PRISM database server provides the beginning point of all replication using these mechanisms.

Figure 9:
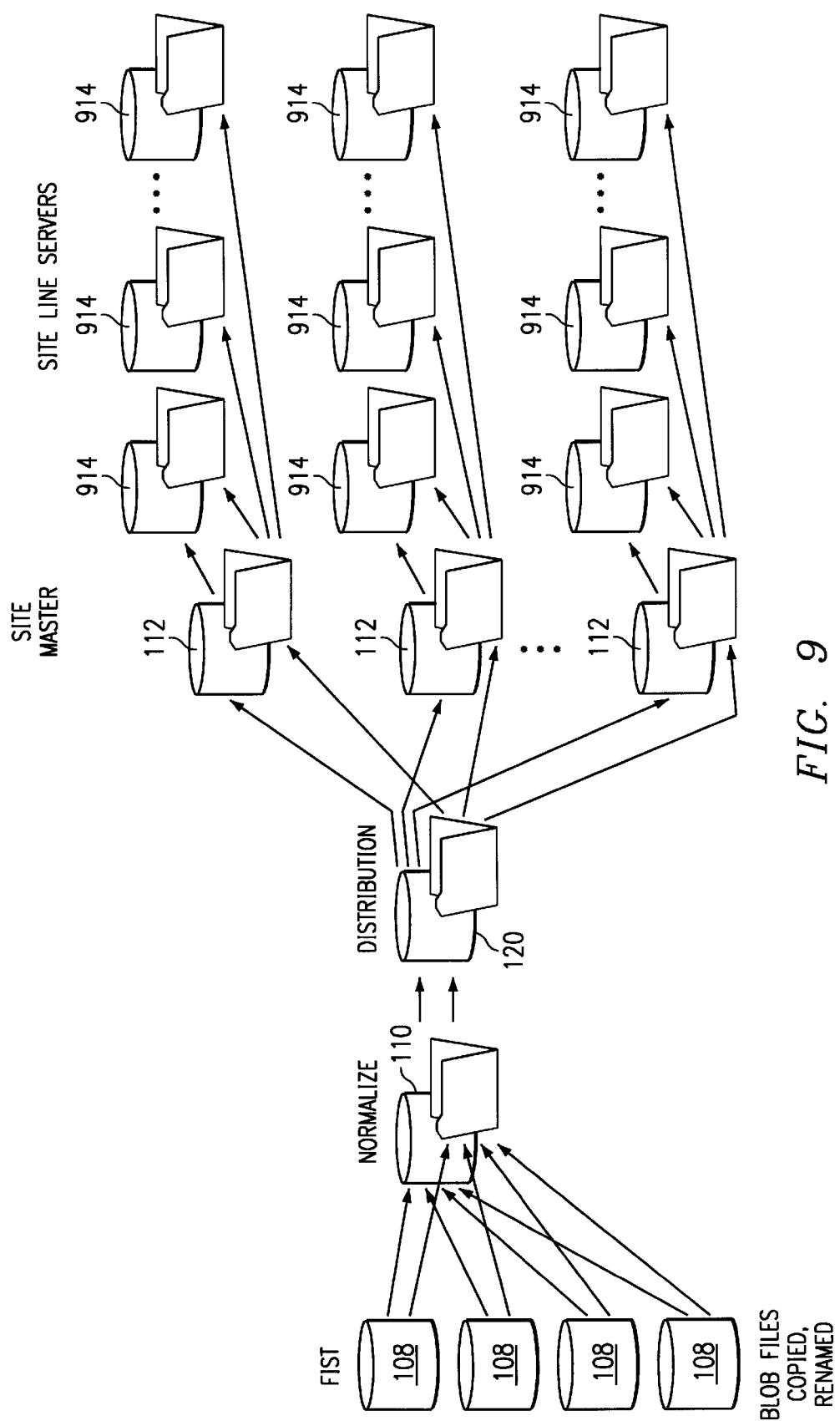
FIG. 9 shows a block diagram of the method by which data associated with released software in the master isolated database is replicated to remote manufacturing sites.

FIG. 9 illustrates the replication architecture with its associated dataflow. In FIG. 9, a machine 120 separate from the master site server is included in the replication set-up. This machine 120 is configured as an SQL Server "Distribution" server for the master PRISM server 110. This configuration allows most of the work of replication to be done by the Distribution server 120, rather than by the master PRISM server 110. Of course, replication to master site databases 112 can be accomplished without this intermediate "distribution" server 120.

Replication of most table data uses built-in transaction replication features of SQL Server. Replication is configured using a tree-like hierarchy. Transactions performed against the master PRISM server 110 are "published" (replicated) to the distribution server 120 (the subscriber to the publication, using SQL Server terminology). The distribution server 120 is configured as a "publisher" machine, and it replicates data to all the master site servers 112. These master site servers 112 are also configured as "publishers", and they replicate data to each of the local SQL servers 914 at their sites. These local SQL servers 914 are used directly by the computer manufacturing software installation process to build the target machines, completing the chain of replication.

Database transaction changes are straightforward to configure using built-in features of SQL Server 6.0. However, since SQL 6.0 does not replicate "image" data types (the actual BLOb files) on a transaction by transaction basis, an external mechanism is used to cause BLOBs to be distributed to all destination SQL Servers. Since SQL Server 6.0 replication depends on primary keys (and since documentation recommends this), all databases beyond the master PRISM database 110 and its associated distribution server 120 are configured with read-only (SELECT only) permissions for all tables. No INSERT, UPDATE, or DELETE operations are allowed to occur (except via Replication mechanisms) to any replicated table in the system beyond the master PRISM database 110.

Replication of Software Releases

Figure 10:
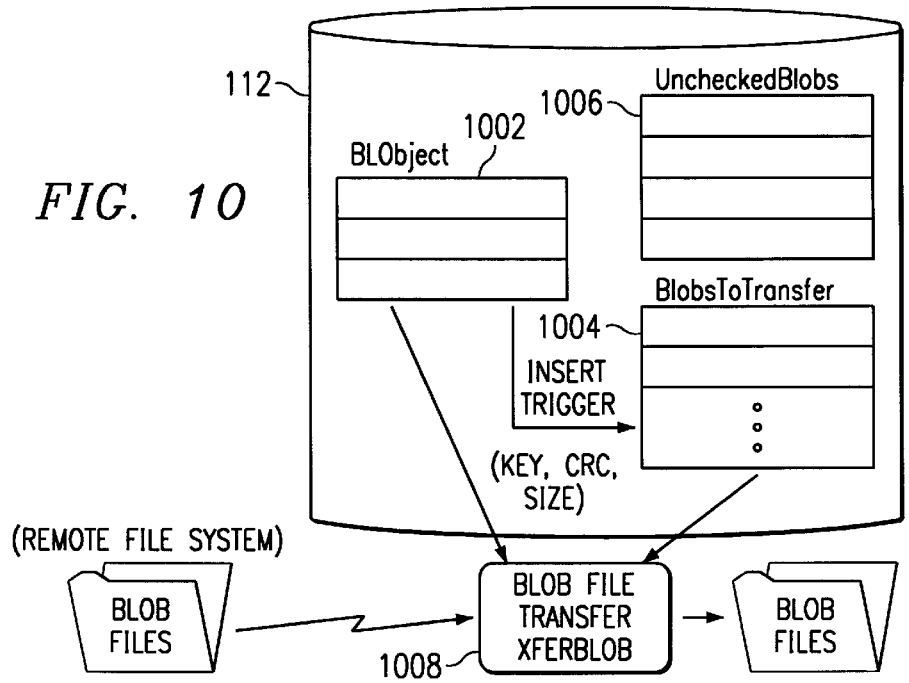
FIG. 10 shows a block diagram of the process by which released software on the master isolated server is replicated to computer manufacturing facility master servers.

As described above, non-BLOb data distribution to all SQL Servers uses built-in replication methods provided by SQL Server. However, a separate external process, illustrated by the block diagram of FIG. 10 is used to transfer BLOb files to each destination's site master server. The mechanism used to replicate BLOb files to site master servers 112 uses a queuing mechanism similar to that used by the FUNS process 702 described earlier. Trigger code associated with the BLObject table 1002 is invoked whenever BLObject records are inserted. The trigger code adds the BLOb-ject. DataKey value to a queue table ("BlobsToTransfer") 1004. The BLOb transfer process (XFERBLOB) 1008 is started on the destination SQL Server 112 at regular intervals by the SQL Executive, using items scheduled via the SQL Server Task Scheduler feature. It processes any records found in the BlobsToTransfer table, copying files from a source server file system to the destination file server. It also checks file MD5 values against those in the destination database.

After each BLOb file is copied, the BlobsToTransfer queue 1004 entry is transferred to another queue table ("UncheckeBlobs") 1006. A separate program, also started periodically by the SQL Executive, processes this queue at regular intervals, and double-checks the transfer process by calculating file MD5 values a second time. If a file processed by this BLOb checking program does not have the same MD5 value as specified in the destination database 112, its UncheckedBlobs queue 1006 entry is moved back into the BlobsToTransfer transfer queue 1004 to be retried.

Figure 11:
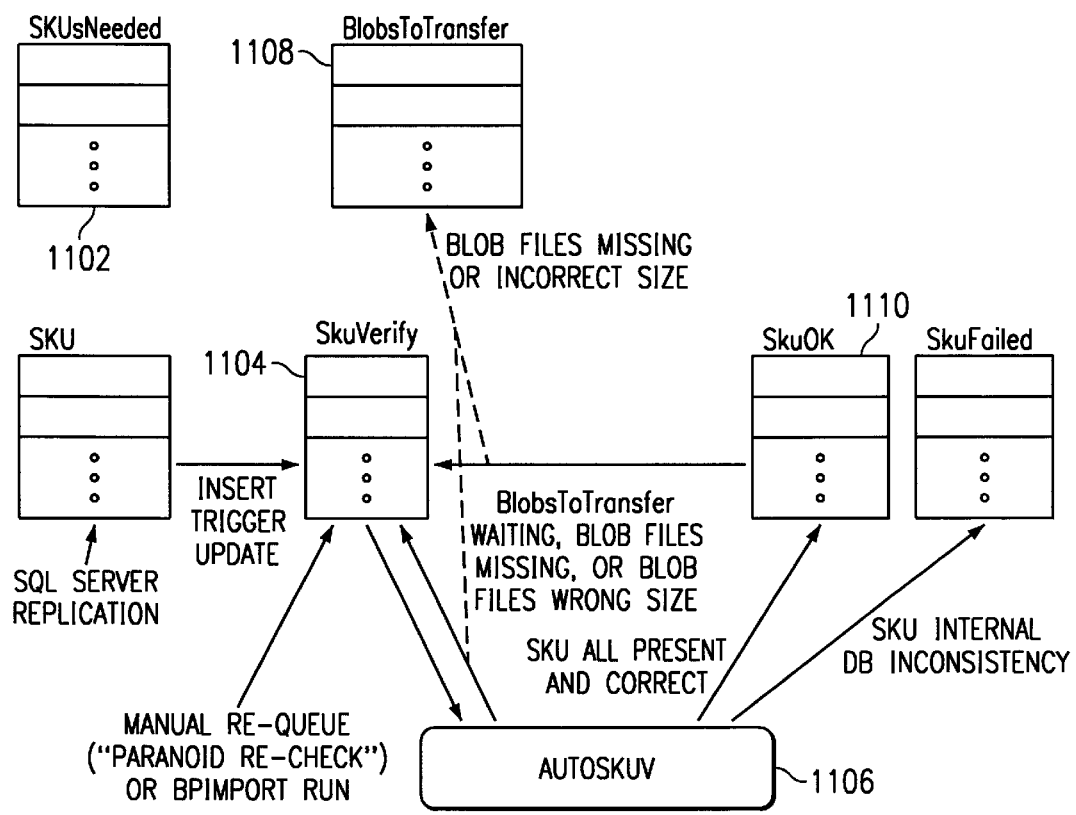
FIG. 11 shows a block diagram of the process by which released software on the computer manufacturing facility master servers is replicated to the local servers.

This BLOb transfer mechanism provides a relatively simple way for files to "tag along" with their associated database entries replicated using SQL Server 6.0 features. BLOb File replication is "complete" when there are no longer any entries in the BlobsToTransfer 1004 and UncheckedBlobs queue 1006 tables. BLOb file transfers occur after database transaction replication events occur, but there is currently no gating mechanism in place to ensure that source BLOb files have completed all "upstream" replication before BLOb file replication to the current server is started. Since the queuing of BlobsToTransfer 1004 entries occurs whenever SQL Server replication is able to process transactions, it is possible that the BLOb transfer process 1008 will attempt to transfer a BLOb file before it has been completely copied to the source file server earlier in the replication chain. This situation does not occur often because the BLOb file transfer process 1008 is scheduled to run almost continuously (every minute), and therefore only slightly behind SQL Server transaction replication. However, if this does occur, the BLOb transfer process 1008 will fail with an MD5 error, and the BLOb will remain in the Blobs to Transfer queue 1004 to be retried on a subsequent invocation. (BLOb Files failing this transfer step are effectively "moved to the end" of the BlobsToTransfer queue by updating their ProcessOrderTime field, to allow the process to continue with other BLOb files, if possible.) Replication of the BLOb file software releases from the master site servers 112 to their associated local servers 914 is slightly more complex. A process which makes use of Build Plan inputs in order to queue to local servers only those BLOb files needed for the current "build plan" is incorporated into the replication process. A method for automatically deleting unneeded BLOb files (those not referenced by SKU's in the build plan) is also utilized. This replication process is illustrated by the block diagram of FIG. 11.

The SkusNeeded table 1102 represents the current build plan for an individual local server 914. This table holds Sku.SkuNumbers for SKU's needed by the local server 914 immediately or in the near future to build the software configurations it will be called upon to build. The BPIMPORT process is run periodically to import the build plan SKU list for each local server from a text file; this process is run periodically as new Build Plans are issued by manufacturing planners.

The BPIMPORT process queues newly needed SKU's into the SkuVerify queue 1104 so that they are checked by the AUTOSKUV verification process. Triggers on the SKU table at each local server 914 are used to queue SKU's to be checked by the AUTOSKUV process 1106 if the SKU's are contained in the current build plan for that local server 914 (the SkusNeeded table) 1102. As SKU's arrive, the Sku.SkuKey values are queued into the SkuVerify table 1104 to be processed by the AUTOSKUV process 1106. AUTOSKUV 1106 checks the SKU's records for internal consistency, and also checks to see that all BLOb files are present or are in the BlobsToTransfer queue 1108 to be transferred.

SKU's which are successfully verified and have all their needed files present are moved from the SkuVerify table 1104 to the SkuOk table 1110. (SDS download tools check the contents of this table when starting a download, to see if an enabled SKU is ready to be built.)

The mechanism used to replicate BLOb files to site line servers also uses a queuing mechanism similar to that shown in FIG. 10, but it transfers BLOb files based on build plan inputs. When the BPIMPORT and AUTOSKUV 1106 processes are run for SKU's needed in the current build plan, AUTOSKUV checks to see that all needed BLOb files for each SKU are either already in the BlobsToTransfer queue 1108, or are actually in the local server 914 file system. In this manner, only BLOb files which are "needed" on the local server 914 are queued for transfer to each individual local server, based on that server's local build plan table. XFERBLOB processes these BlobsToTransfer 1108 items just as is done for master site servers 112—the difference in this setup is that only selected BLOb files are queued for transfer to each line server, not the complete set of BLOb files.

XFERBLOB also invokes CLEANPFS if and when the local server file system becomes full. The CLEANPFS.EXE program provides a way to detect and delete any files in the BLOb file system of a server which are not referenced by any records in the BLObject table. It is intended to be used on a relatively infrequent basis in order to help keep the master PRISM database 110 and BLOb file systems 112 and 914 synchronized, reclaiming extra space not needed by currently active BLOb files.

CLEANPFS recursively scans a particular server directory tree looking for files with paths and names that match the general BLOb file naming convention described earlier. For all such files found, it reverse formats the path name into a BLObject.DataKey value and looks in the master PRISM database 110 to see if the BLOb exists. If the BLOb does not exist, the BLOb file is deleted. Otherwise the BLOb file is left in place. The process ignores but can count and optionally log any files found which don't follow the BLOb file naming conventions.

CLEANPFS is meant to be invoked by the SQL Server Task Scheduler. However, when run from XFERBLOB, it deletes files which are no longer needed by SKU's in the build plan. When CLEANPFS is complete, XFERBLOB continues with the remaining BlobsToTransfer entries.

CLEANPFS may also be run periodically to delete unneeded files before the server runs out of Blob File space. However, this mode of operation performs a large amount of SQL query processing, and so will take a long time to process if the contents of the SkusNeeded table 1102 is large.

Once the database replication and BLOb transfer processes are complete at the local database and server level 914, the software download and installation process can be initiated.

Figure 12:
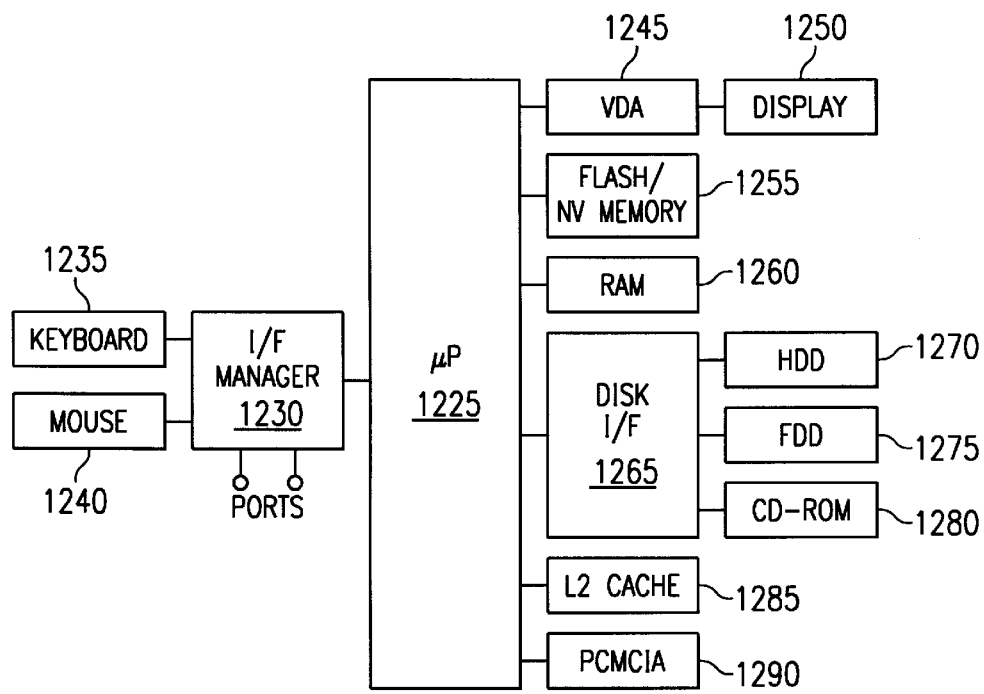
FIG. 12 shows a block diagram of a personal computer which can use the innovations described in this application.

FIG. 12 shows a personal computer which can use the innovative software distribution system. The complete personal computer system, includes in this example:

user input devices (e.g. keyboard 1235 and mouse 1240);
at least one microprocessor 1225 which is operatively connected to receive inputs from said input device, through an interface manager chip 1230 (which also provides an interface to the various ports);
a memory (e.g. flash or non-volatile memory 1255 and RAM 1260), which is accessible by the microprocessor;
a data output device (e.g. display 1250 and video display adapter card 1245) which is connected to output data generated by the microprocessor 1225; and
a magnetic disk drive 1270 which is read-write accessible, through an interface unit 1265, by the microprocessor 1225;

Optionally, of course, many other components can be included, and this configuration is not definitive by any means. For example, the personal computer may also include a CD-ROM drive 1280 and floppy disk drive ("FDD") 1275 which may interface to the disk interface controller 1265. Additionally, L2 cache 1285 may be added to speed data access from the disk drives to the microprocessor, and a PCMCIA 1290 slot accommodates peripheral enhancements.

Software Installation at the Computer Manufacturing Facility

Figure 13:
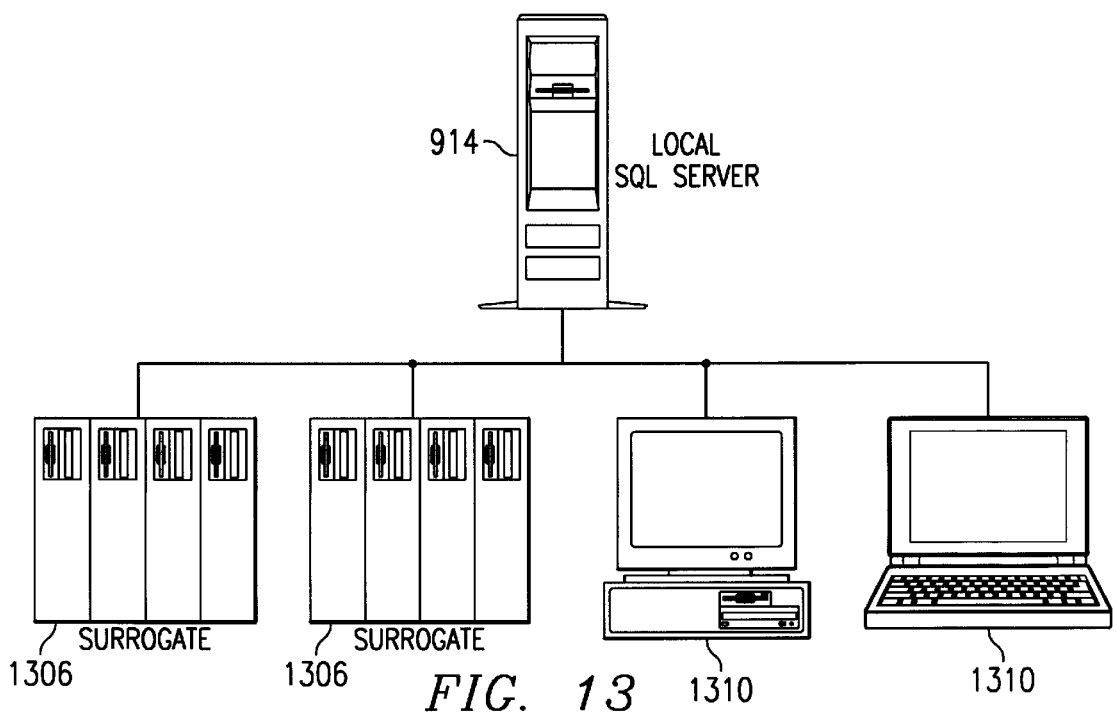
FIG. 13 shows a block diagram of the system architecture at the factory download site.

FIG. 13 illustrates the download system architecture at the computer manufacturing facility. At the facility, individual hard drives or single unit computers can be preinstalled with software. If software is to be pre-installed on a hard drive, the drive is placed into a surrogate machine 1306 which will provide connectivity to the local SQL server 914 and power to the drive. The download process then takes place in surrogate mode (described below). If software is to be pre-installed on an assembled computer 1310, the computer provides its own connectivity to the local SQL server 914. The download process then takes place in direct mode (described below). Surrogate and direct download machines are typically not connected to the same local SQL server 914 but can be (as depicted).

For purposes of the software download process, the local SQL server 914 runs a process, PRISMD. PRISMD is used as an aid to the machines to be pre-installed in finding the nearest local server on the LAN.

Figure 14:
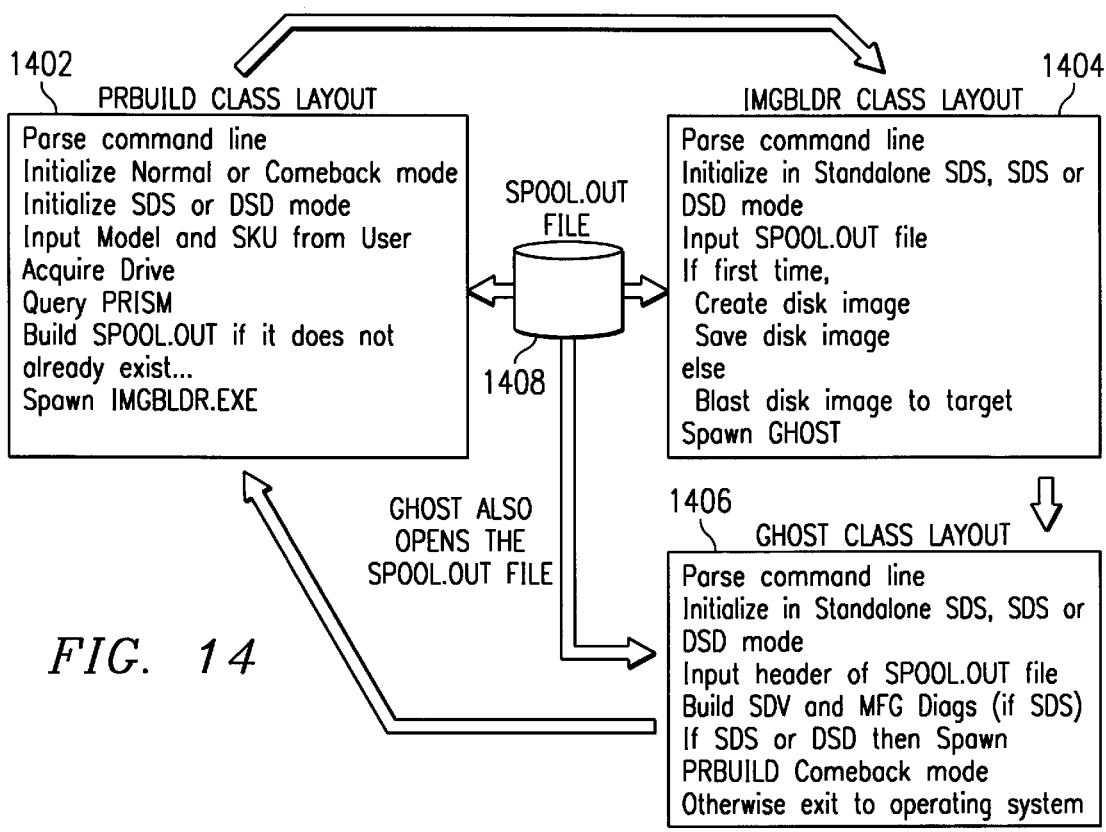
FIG. 14 shows a flow chart of the software download process.

The download process is initiated by the machine on which software will be installed (1306 or 1310). The download tool utilized in the preferred embodiment is referred to as GEMINI. FIG. 14 illustrates in block diagram form the three independent processes which comprise the GEMINI software download process.

GEMINI allows both the surrogate and direct download processes to be executed from a boot diskette inserted into either the surrogate machine or an assembled computer. The boot diskette contains the information necessary for the machine, as operated in the factory, to locate the server and establish a connection with a unique ID, identify the drive to be loaded, determine which files to download, determine which diagnostics need to be run upon download completion, verify part serial numbers, and update itself from the server in the event of a new floppy disk boot version.

The GEMINI system splits the download process into three separate functions: 1) obtain a SKU and create a BOM list; 2) Build a drive w/ the proper components and partitions based on the BOM list; and 3) Build ghost partitions in which software download verification and manufacturing diagnostic processes can be run. The programs were broken apart to increase available memory.

PRBUILD 1402: this process makes a 'packing' list of what files are needed for the given SKU as well as other global information about the drive such as file system type, boot file specs, etc. Once this list is made, PRBUILD 1402 spawns the next module: IMGBLDR 1404.

IMGBLDR 1404: this process takes as its input the packing list that was the output of PRBUILD 1402 and builds a drive with any combination of FAT16/FAT32 partitions. Once the drive is built, IMGBLDR 1404 spawns the next module: GHOST 1406.

GHOST 1406: this process takes as its input the packing list that was the output of PRBUILD 1402 as well as information about the end of data on the drive provided by IMGBLDR 1404 and builds ghost partitions on the drive.

GEMINI Module Communication

Currently, three methods exist for PRBUILD 1402, IMGBLDR 1404, and GHOST 1406 to communicate as they invoke each other: command line parameters, the World object and the SPOOL.OUT file 1408.

The command line parameters provide a simple way to communicate global states that are normally non-changing. A good example are the command line switches which allow PRBUILD 1402 to call IMGBLDR 1404 in a certain mode which will make their operation appear as one module to the user. The SPOOL.OUT 1408 file allows for much more specific and detailed instructions to be communicated between the three modules as well as being a convenient place to store certain persistent data such as the log structure. The World object is a persistent object that uses XMS memory to save its state for information that is not included in the SPOOL.OUT file 1408.

The SPOOL.OUT 1408 file contains all of the specifications to build a drive with a certain SKU/Revision. This is drive independent because at the moment SPOOL.OUT 1408 is constructed there is no knowledge of the drive geometry.

The file consists of three main parts:

the header a variable number of fixed length partition information records a variable number of fixed length records each of which specify a file to be installed on the target hard drive.

Below is a listing of the Header ExpandedFileHeader structure. All data structures are byte aligned.

SPOOL.OUT 1408 Header

| | | |
|---|---|---|
| Float | FHeaderFileCheckVersion | Version of header file info |
| Float | FBldSoftwareVersion | Version of software (obsolete) |
| DWORD | dBomSizeInFiles | Size of total drive image in files |
| DWORD | dBomSizeInBytes | Size of total drive image in bytes |
| DWORD | dBomSizeInMBytes | Size of total drive image in MB |
| DWORD | DBomCurrentPass | Unused |
| DWORD | DSKUCurrentRevision | Unused |
| DWORD | DBomCurrentRevision | Unused |
| DWORD | DMinSystemPartitionSize | Unused |
| Long | LBomStartTime | UNIX time process started |
| Long | LbomEndTime | UNIX time process ended |
| Long | LbomCopyTime | UNIX time copy ended |
| Long | LbomDiagTime | UNIX time diag loading ended |
| Long | LbomLocalHDTime | Unused |
| Long | LbomBlastTime | UNIX time blasting ended |

-continued

| | | |
|---|---|---|
| Float | FHeaderFileCheckVersion | Version of header file info |
| WORD | WBomNumRootEntries | Number of directory entries for root directory of partitions. Not used |
| BYTE | CBomNumPartitionRecs | Number of partition in drive image |
| BYTE | BOperatingMode | Signals SDS or DSD mode |
| BYTE | BlastDriveType | Unused |
| CHAR[26] | CBomNumber | BOM ID of drive image |
| CHAR[26] | CBomSku | SKU number of master component |
| CHAR[30] | CBomSite | Server machine is connected to |
| CHAR[13] | CbomUnitSN | Unit serial number |
| CHAR[13] | CBomSurrogateSN | Surrogate's Serial number (blank for DSD mode) |
| CHAR[120] | CBomErrorMsg | Used to hold exception error messages |
| CHAR[257] | CBomBootMasterName | Path to MBR for drive image |
| CHAR[7] | CBomErrorCode | Exception number storage area |
| CHAR[5] | CBomSoftware | Unused |
| CHAR[128] | CBomSetupFileName | Unused |

This header can be found at offset 0 in the SPOOL.OUT 1408 file. Session timing information and data are found there. Most of this information is not used by IMGBLDR 1404—but it allows the next instance of PRBUILD 1402 to pick up where it left off by reloading the LOG structure and creating any needed data areas before spin down.

The field named CBomNumPartitionRecs tells the number of ExpandedPartitionInfo records that follow the header information. These records start immediately after the header and include one record for each partition.

SPOOL.OUT 1408 Partition Info

| | | |
|---|---|---|
| DWORD | PiPartSizeMb | Size in MB of partition. Zero means use all available space. |
| DWORD | PiPartSizeInSectors | Unused. |
| DWORD | PiGhostSizeInMBytes | Used to hold sizing information for the Ghost partitions only. |
| DWORD | PiGhostSizeInFiles | Unused |
| DWORD | PiGhostMaxPartSizeMb | Unused |
| WORD | PiBootSectorSize | Length in bytes of the boot sector file |
| CHAR | PiDriveOrder | Drive Number partition is on |
| CHAR | PiPartitionOrder | Ordering of the partition on the drive |
| CHAR | PiPartitionType | Type of file system |
| CHAR | PiBootable | Set to 1 when partition should be set active |
| CHAR | PiGhostType | Type of Ghost file system |
| CHAR[256] | PiSecondartBootSector | NamePath to secondary boot sector - used for loading diagnostics |
| CHAR[256] | PiBootSectorName | Path to partition boot sector |
| CHAR[256] | PiGhostPrimaryPath | Path which, with all subdirectories, is to be loaded into the ghost partition |
| CHAR[256] | PiGhostSecondaryPath | Secondary path - contents of this subdirectory and all of its directories are also added to the ghost parti- |

-continued

| | | tion after the primary path is processed |
|---|---|---|

The third part of SPOOL.OUT 1408 is the file specification records—a listing of the ExpandedFileEntryType, structure.

SPOOL.OUT 1408 File List

| CHAR[64] | PszSource | Path on server for data |
|---|---|---|
| CHAR[256] | PszDestination | Path on drive for data |
| CHAR[14] | PszDosName | Name of file on drive image |
| BYTE[8] | FblobKey | Database key of BLOB |
| DWORD | FunixWriteDate | UNIX form of file write date/time |
| DWORD | FunixLastAccDate | UNIX form of file access date/time |
| DWORD | FunixCreateDate | UNIX form of creation date/time |
| DWORD | Fsize | Size of file in bytes |
| WORD | FwriteDate | DOS form of file write date |
| WORD | FlastAccDate | DOS form of access date |
| WORD | FcreateDate | DOS form of creation date |
| BYTE | FcreateTimeMs | Millisecond field of extended file creation date (not used) |
| BYTE | FdestPartition | Partition which will receive the file |
| BYTE | FphysicalOrder | Not used |
| UCHAR[16] | FMD5 | MD5 value for BLOB |
| BYTE | Fattribs | DOS FAT attributes |
| BYTE | FHasLFN | Signal that file has an associated LFN |

The BlobKey is used to locate the file in a hashed index of all files stored in the current image in the image cache. If it is found, a special method in the class DImage (DIMAGE.CPP) will add the file to the drive image on the target using new methods in the classFatFileSystem class which take a buffer as their argument instead of a filename. If not found, the normal path is taken using Process_Fileo( ) in FillPartition( ). In any case, after a file is added to the new target drive, its BlobKey, size and starting sector number position in the target image are logged in the hashed index kept by DImage( ) and Chash( ).

Whereas the records used to start at offset 0 in the SPOOL.OUT file 1408, they now start at offset:

(SIZE OF (Expanded File Heder)+ExpandedFileHeader.cBomNumPartitionRecs * SIZEOF(ExpandedPartitionInfo))

GEMINI Module Execution

The execution of PRBUILD 1402 proceeds as follows:

1) If in surrogate download mode.
2) If a drive is not attached, prompt for one to be connected.
3) Turn on power to and wait for drive to spin up.
4) If spin up fails, run SYSCFG. If SYSCFG has already been called three times, fail the drive. If returning in comeback mode, spin down the drive, display pass, and wait until a new one is attached.
5) Connect to SQL Database 914 pointed to by SQL.DAT on the floppy or the SQL environment variable or the SQL value from A: \DSD.TXT if in CCP mode (described below).
6) Create SQL work tables for this connection.
7) If in direct download mode, prompt for a serial number if a valid one does not exist in CMOS. The serial number may also be obtained form the User Input Area in certain situations.
8) If in surrogate download mode, prompt for serial number until one is entered that matches the serial number mask.
9) If a CTO serial number is entered, the program operates in CTO mode (described below).
10) Prompt for SKU number until a valid one is entered. If DSD mode, the SKU may also be obtained form the User Input Area in certain situations.
11) If in CTO or CCP mode, call procedures to build the CTO.TXT software components list and the CTO-HW.TXT hardware components list if valid data is returned.
12) Call a procedure to add the requested SKU onto the database representation of the image.
13) Call a procedure to build the drive in the database worktables.
14) Call a procedure to get global drive information which is saved in the state object.
15) Call a procedure to get partitioning data into the SPOOL.OUT file.
16) If in direct download mode and factory diagnostics are to be placed on the hard drive, WORLD.DAT is updated and Diags information is added to SPOOL.OUT 1408 so that GHOST 1406 is able to create a Diags partition and load the proper files.
17) Query #image to get the list of files to download and save them into the SPOOL.OUT file.
18) Logout from the database.
19) Transfer control to IMGBLDR 1404.

The execution of IMGBLDR 1404 proceeds as follows:

1) Open SPOOL.OUT 1408 and Cworld object created by PRBUILD.
2) Create the skeleton of the drive image in memory.
3) For each partition, create that partition on the external drive and load it with files according to the SPOOL.OUT file 1408.
4) If in surrogate download mode, save the image in the cache if appropriate.
5) If SCANDISK.FLG is set, run an MD5 and Scandisk on first download.
6) Run MD5 and Scandisk on second download.
7) Transfer control to GHOST 1406.

The execution of GHOST 1406 proceeds as follows:

1) Open image list file created by PRBUILD 1402.
2) If software download verification (SDV) is requested, save the current Master Boot Record (MBR)in the correct slot.
3) Create a ghost partition on the end of the drive, load the files found in the V: \ NEWSDV network directory, and save all information in memory. If in CCP mode, create the file CCP.TXT in the root of SDV ghost partition to signal SDV.
4) If running in surrogate download mode and there is enough space, save the ghost partition onto the Surrogate hard drive.
5) If diagnostics (DIAGS) are requested, save the current MBR in the correct slot, create a ghost partition on the end of the drive, load the files found in the directory (and all of its subdirectories) stored in the header information of the SPOOL.OUT 1408 into it, and commit the information. If in CTO or CCP modes, copy the file CTOHW.TXT obtained by PRBUILD to the root directory of the diagnostics ghost partition. If in CCP modes, create the file CCP.TXT in the root directory of the ghost partition to signal particular mode to diagnostics. Again, if surrogate mode and there is enough space on the cache drive and in the BOM Index, save the diags ghost partition on the Surrogate hard drive if appropriate.

6) Return control to PRBUILD 1402.

Configure To Order, or CTO mode provides a way to build a unique software configuration for which no standard SKU exists. There are two ways to trigger CTO mode:

User Mode—This mode is intended for use by rework sites and in situations where the batch size is not big enough to justify the overhead of the image-caching scheme.

Automatic Mode—which is triggered by scanning in a serial number with the CTO flag in it (such as a particular alpha numeric character in a given code).

Both modes are identical, except that automatic mode is activated per serial number and will automatically reset back to image caching mode if a normal serial number is scanned. User mode is persistent for that run of the download tools. When automatic CTO mode is triggered, the program will call a stored procedure on the server, which then calls the SFDM database to get a list of components and save them in #sfdm, a temporary table.

After the list of software components is downloaded, a listing of the contents is used to create a copy of the CTO.TXT file on the RAM drive by querying #sfdm. This file is added to the list of files loaded on the drive image and is put into C: \ SYSTEM.SAV. If the directory does not exist in the image, it will be created. If there is no user partition in the image, the file creation will never occur and the contents will be lost.

For each component listed in the CTO.TXT file, the server is told to add it into the working set by calling a set of procedures for each component, which is stored #sfdm. This stored procedure updates the image state to contain all files in the component. When all components are added, the program calls another stored procedure to build the full list of files to download.

After the software components list, a second store procedure is called to get a list of hardware components used by diagnostics. If valid data is returned by the stored procedure the text file CTOHW.TXT is created on the RAM drive. This file is copied from RAM drive to the diagnostics ghost partition when is created. This file is also added to the list of files loaded on the drive image and is put into C: \ SYSTEM.SAV subdirectory of the primary user partition. If the \ SYSTEM.SAV directory does not exist in the image, it will be created. If there is no user partition in The image, the file will only be copied to the diagnostics ghost partition.

The format of CTOHW.TXT does not contain any headers and it lists all the part numbers in one single line. Each part number (6-3) is followed by a comma and the quantity with no spaces in between. A carriage return is added at the end of the line.

A sample of the contents of a CTOHW.TXT file:
123456-001,1,213456-001,1,323456-001,3,623456-001,2 PRBUILD 1402 then queries the # components table to get the size of the files in bytes, and the number of files.

After that, PRBUILD 1402 calls a stored procedure to get the partition information followed by a call to another stored procedure to add the files CTO.TXT and CTO-HW.TXT to # image.

Pseudocode for the CTO download procedure would resemble the following:

Entry Point for CTO mode

Create temporary SQL tables

Call SFDM communication RPC procedure and wait for results. If an error occurs, abort.

Build CTO.TXT file in the swap area

Call sp_gemini_sfdm_convert RPC procedure which calls sp_gemini add_component for each entry in the CTO.TXT. Wait for results. If an error occurs, abort with an operator message.

Call xp_Hardware_Components to build CTOHW.TXT file in swap area and add file to component list.

Call sp_gemini_image_complete RPC procedure to finalize the image and wait for results. If an error occurs, abort.

Call sp_gemini_get_drive_info to build drive partitioning information

Build image list file in RAM by querying# image table and waiting for results. If an error occurs, abort.

Exit CTO specific code and pass control on to IMGBL-DR.EXE While running in CTO mode, new files will be added to the internal cache drive as the software is running and space will be allocated to them in the index header, but no BOM entry will be made for them. If there are files in the components that overlap (i.e. exist in different components with the same name and destination directory), the program will keep one as described in the sp_gemini_image_complete section above.

When the cache drive reaches a point where it is within a 50 MB of filling, the Surrogate will switch to 'image mode' and complete the current build, wipe the database, and store the full image at the beginning of the cache area as a starting point.

In CTO mode, DIAGS will be cached, but SDV will not (since the SDV software package currently contains the MD5 listing).

Channel Configuration Partner, or CCP mode provides a way for 3d party manufacturers to configure and install software at remote computer manufacturing sites. There are two ways to trigger CCP mode:

User Mode—This mode is intended for use by Channel Configuration sites, which is called by a control program written by the preinstall group.

Automatic Mode—is triggered by detecting a particular alphanumeric character in a particular place in the unit serial number.

When CCP mode is triggered, the program will call a stored procedure on the server, which then calls the SFDM database to get a list of software components and save them in#sfdm, a temporary table. After the list of software components is downloaded, a listing of the contents is used to create a copy of the CTO.TXT file on the RAM drive by querying #sfdm. This file is added to the list of files loaded on the drive image and is put into C: \SYSTEM.SAV. If the directory does not exist in the image, it will be created. If there is no user partition in the image, the file creation will never occur and the contents will be lost.

For each component listed in the CTO.TXT file, the server is told to add it into the working set by calling stored procedures for each component stored in#sfdm. This stored procedure updates the image state to contain all files in the component. When all components are added, the program calls a stored procedure to build the full list of files to download.

After the software components list, a second store procedure is called to get a list of hardware components. If valid data is returned by the stored procedure the text file CTO-HW.TXT is created on the RAM drive. This file is copied from RAM drive to the diagnostics ghost partition when is created. This file is also added to the list of files loaded on the drive image and is put into C: \SYSTEM.SAV subdirectory of the primary user partition. If the \SYSTEM.SAV directory does not exist in the image, it will be created. If there is no user partition in the image, the file will only be copied to the diagnostics ghost partition.

The format of CTOHW.TXT does not contain any headers and it lists all the part numbers in one single line. Each part number (6-3) is followed by a comma and the quantity with no spaces in between. A carriage return is added at the end of the line.

A sample of the contents of a CTOHW.TXT file:

123456-001,1,213456-001,1,323456-001,3,623456-001,2

PRBUILD 1402 then queries the# components table to get the size of the files in bytes, and the number of files.

After that, PRBUILD 1402 calls a stored procedure to get the partition information followed by a call to a second stored procedure to add the files CTO.TXT and CTO-HW.TXT to # image.

A CCP download process would resemble the following:

Entry Point for CCP mode

Initialize RPC and create temporary tables.

Call SFDM communication RPC procedure (sp_gemini_sfdm) and wait for results. If an error occurs, abort.

Build CTO.TXT file in the swap area and add file to component list.

Call RPC procedure sp_gemini_sfdm_convert and wait for results. If an error occurs, abort.

Call xp_Hardware_Components to build CTOHW.TXT file in swap area and add file to component list.

Call sp_gemini_image_complete RPC procedure to finalize the image and wait for results. If an error occurs, abort.

Call sp_gemini_get_drive_info to build drive partitioning information

Build image list file in RAM by querying # image procedure and waiting for results. If an error occurs, abort.

Exit CCP specific code and pass control on to IMGBLDR 1404

Software Download Verification

Figure 17A:
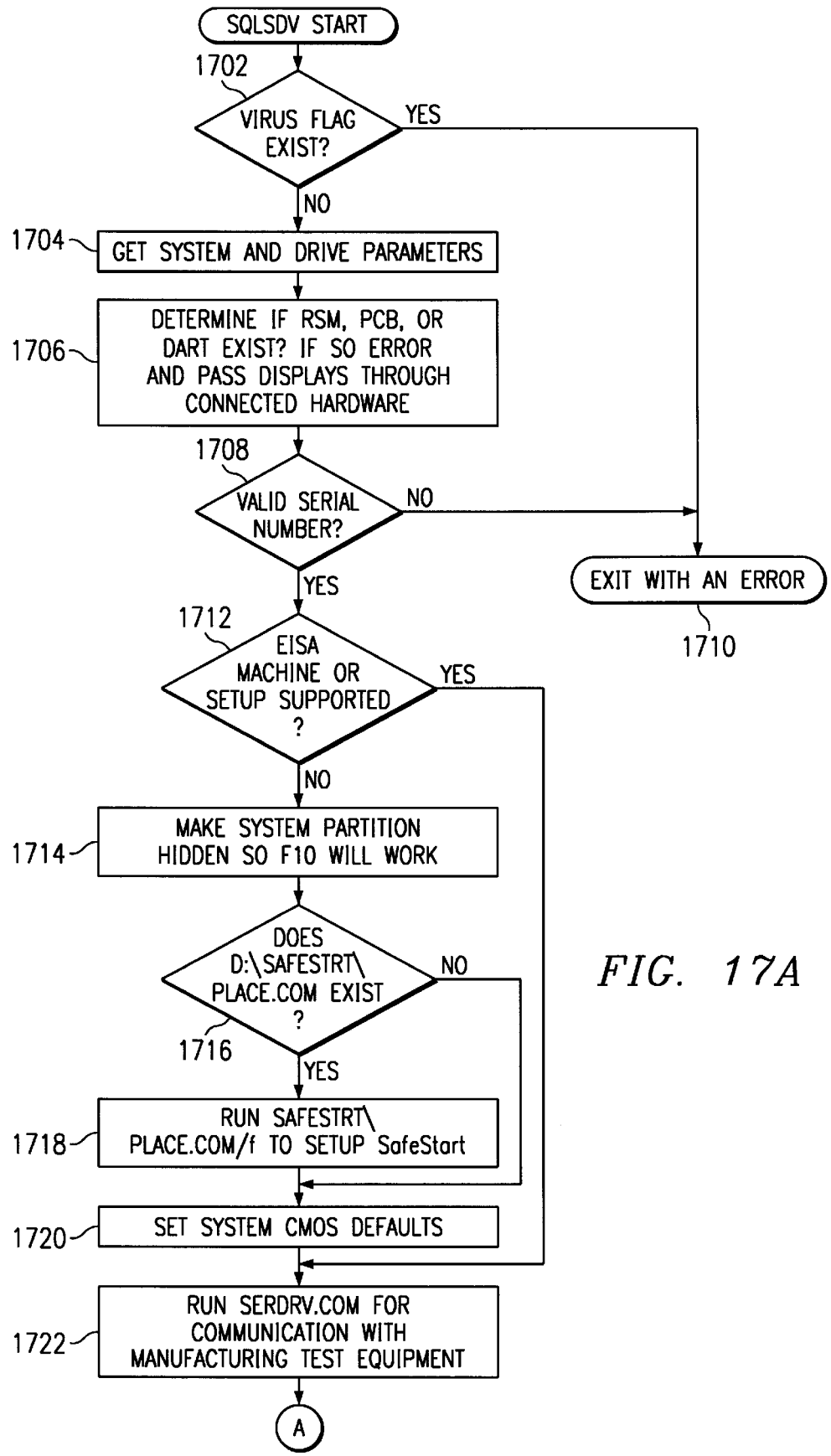
FIGS. 17A–B illustrate in flowchart form the software download verification process.
Figure 17B:
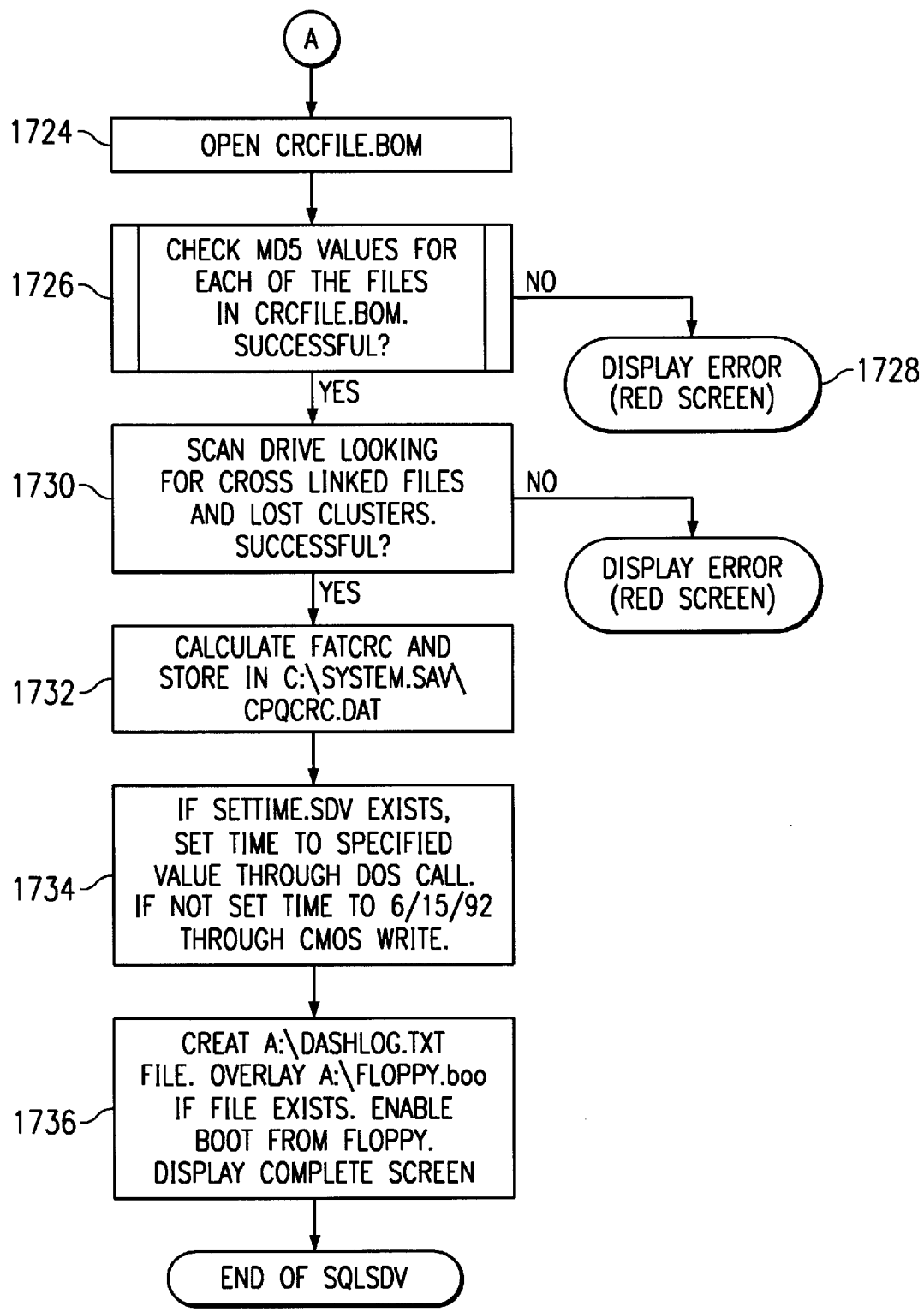

SQL Software Download Verification confirms that, data downloaded to the hard drive during the installation process is valid and error-free. FIG. 17 illustrates in flowchart form the software download verification process, SQLSDV. SQLSDV uses a file containing checksum values for all the BOM files downloaded in either the surrogate or direct downloading process to verify their accuracy. SQLSDV also sets the data and time of the internal clock of the machine. Further, SQLSDV can interface with a variety of factory monitoring systems which perform separate diagnostic tests.

Prior to running SQLSDV, the AUTOEXEC.BAT file checks for viruses. If a virus is detected, a flag file is written to the SDV partition. If this file exists 1702 SDV will exit with a red error screen 1710. When SQLSDV executes, it first obtains system parameters to display and control the process flow at a later time in the program 1704. Also, the drive parameters (Heads, Cylinders, Sectors) of the machine being verified are obtained. Next, SQLSDV determines if one of two process (Run-in Status Monitor (RSM) or DART status) is running on a server connected to the network 1706. RSM and DART are quality control systems which run in the factory. Both RSM and DART provide information on the current state of machines in the download process. The system's Serial Number is then read from CMOS and validated 1708.

Next, SQLSDV determines if the machine is an EISA or ISA machine, and if it is Setup supported by the system 1712. If the machine is an EISA machine or if Setup is supported then the system partition needs to be prepared and the appropriate configuration application run. To do this SQLSDV performs the following tasks:

Make the system partition hidden so the F10 setup function will work 1714.

This is done by modifying the system partition table. The system partition table is structured as follows:

| Offset from start of sector | Size(bytes)Description |
| --- | --- |
| 0x001 | Boot indicator |
| 0x011 | Beginning Head |
| 0x021 | Beginning Sector |
| 0x031 | Beginning Cylinder |
| 0x041 | System Indicator |
| 0x051 | Ending Head |
| 0x061 | Ending Cylinder |
| 0x071 | Ending Sector |
| 0x084 | Starting Sector (relative to beginning of disk) |
| 0x0C4 | Number of sectors in partition |

Clear archive bits from all files in the system partition. This is required for the partition to boot properly.

Label the system partition with the volume label "DIAGS". This is required so that the ROM can validate that the partition is a valid F10 system partition.

If D: \SAFESTRT\PLACE.COM exists 1716 run PLACE.COM/f to set up Safestart 1718.

If the machine is an EISA machine run CF/f to configure the system. Otherwise the machine is an ISA machine. Attempt to execute Int 15 Function 0×E841 (Set CMOS defaults) 1720. If this function fails (CF set) run SETUPB to configure the system.

Run SERDRV.COM to setup the system to light up LEDs if an RSM is connected 1722. If an RSM is not connected unload SERVER by executing it again with a command line option telling it to unload, and run DARTSER.COM to determine if DART is connected. If DART is not connected, run DARTSER.COM again to tell it to unload.

C: \CRCFILE.BOM contains a list of all data areas that were down-loaded loaded with their full path and MD5 value. This is used for ALL partitions, including the system partition. The CRCFILE.BOM file is opened 1724 and each line is read to obtain the path for each data area on the disk to be checked. Each data area's MD5 value is calculated and verified against the MD5 value contained in the CRCFILE-.BOM file 1726. If a file's MD5 value in CRCFILE.BOM does not match the calculated MD5 value a red screen is displayed and SQLSDV exits 1728.

The hard drive is scanned to verify that the FAT Table is intact with no cross-linked files and no lost clusters 1730.

The CRC value of the FAT Table is then calculated and stored in the file C: \SYSTEM.SAV\CPQCRC.DAT for future use 1732. If the FAT table CRC matches what is stored in this file it is determined that a unit has been used. This prevents the sale of used units as new.

Set the date and time 1734.

Finally, if the unit was downloaded in surrogate mode the floppy is checked for a file called FLOPPY.BOO. If it exists it is overlayed over the floppy disks boot sector to prevent inadvertent boots to the hard drive 1736.

Further details of the system context and of options for implementation may be found in MICROSOFT SQL SERVER ADMINISTRATOR'S COMPANION, Ramez Elmasri & Shamkant Navathe, FUNDAMENTALS OF DATABASE SYSTEMS (1989); Martin Gruber, SQL INSTANT REFERENCE (1993); and James L. Johnson, DATABASE MODELS, LANGUAGES, DESIGN (1997); all of which are hereby incorporated by reference.

According to disclosed embodiments there is provided a method for manufacturing computers with pre-installed software, said method comprising the actions of: storing software to be pre-installed at computer manufacture on a first server; isolating said software into a separate isolated server by: referencing and eliminating any duplicate software existing between said first server and said isolated server and updating any software that has been revised; and manufacturing computers with said software pie-installed from said separate isolated server; whereby each file is stored only once in said separate isolated server.

According to disclosed embodiments there is provided a method for manufacturing computers with pre-installed software, comprising the actions of: creating a structured database containing references to software objects to be preinstalled with a structure of associations which allows duplicate files to be referenced and removed from a server, and storing said software objects on said server according to said database references; isolating said structured database and files into separate database structures and servers by: referencing and eliminating any duplicate files existing between the isolated and structured servers; referencing and eliminating any duplicate references existing between the isolated and structured databases; and updating any references that have been modified; and manufacturing computers with said software pre-installed from said separate database structures and servers; whereby each file is stored only once in said separate server and each file reference in said separate database is unique.

According to disclosed embodiments there is provided a method for manufacturing computers with pre-installed software, comprising the actions of: in a first software generating group, storing software objects to be pre-installed at computer manufacture on a first respective server; isolating said software objects into a separate respective isolated server by: referencing and eliminating any duplicate software objects that may exist between said first server and said isolated server; updating any software objects that have been revised; and creating a catalog structure containing references to said added or updated software; repeating steps (a.)–(b.) one or more times for multiple software generating groups with separate respective servers and separate respective isolated servers; merging all said isolated servers into a master isolated server by, for each isolated server: referencing and eliminating any duplicate software objects existing between each separate isolated server and master server; and referencing said catalog structure to perform, update, insert and duplicate eliminating operations for each entry in said catalog; and manufacturing computers with said software preinstalled from said master isolated server; whereby each software object is stored only once in said master isolated server and a full comparison of servers is avoided.

According to disclosed embodiments there is provided a method for manufacturing computers with pre-installed software, comprising the actions of: in a first software engineering group, creating a first respective structured database containing references to software objects to be pre-installed installed with a structure of associations which allows duplicate files to be referenced and removed from said server and storing said software objects on a first respective server according to database said references; isolating said structured database and files into separate database structures and servers by: referencing and eliminating any duplicate files existing between the isolated and structured servers; referencing and eliminating any duplicate reference existing between the isolated and structured databases; updating any references that have been modified; and creating a catalog containing said added or updated references; repeating steps (a.)–(b.) one or more times for multiple software generating groups with separate respective structured databases and separate respective servers; merging all said isolated structured database and associated server files into a master isolated database and master isolated server by, for each isolated structured database and associated server: referencing and eliminating any duplicate files existing between the isolated and master servers; referencing said catalog structure to perform, update, insert and duplicate eliminating operations for each entry in said catalog, wherein a full database comparison is avoided; and updating any references that have been modified; repeating the merging actions of step (d.) for each isolated structured database and associated server files; and manufacturing computers with said software preinstalled from said master isolated database and master isolated server; whereby each software object is stored only once in said master isolated server and each software object reference in the master database is unique.

According to disclosed embodiments there is provided a method for manufacturing computers with pre-installed software, said method comprising the actions of: releasing software which is associated with an identifier as to its purpose; associating each particular manufacturing site with an identifier as to its purpose; using a procedure which automatically replicates said software releases to said particular manufacturing sites, each said software release being replicated only to those sites whose associated identifier matches the associated identifier of the software; and manufacturing computers with said software preinstalled at said particular manufacturing sites; whereby said software is stored only at particular manufacturing sites. According to disclosed embodiments there is provided a method for manufacturing computers with pre-installed software, said method comprising the actions of: releasing software components, associated as a group through an identifier, said group being associated with an identifier as to its purpose; associating each particular manufacturing site with an identifier as to its purpose; using a procedure which automatically replicates said group of components to said particular manufacturing sites, each software group being replicated only to those sites whose associated identifier matches the associated identifier of the software group; and manufacturing computers with said software preinstalled at said particular manufacturing sites; whereby said group of component is stored only at particular manufacturing sites.

According to disclosed embodiments there is provided a method for selective replication of a database with associated external files to accommodate computer manufacturing with pre-installation of software, said method comprising the actions of: utilizing DBMS software to automatically replicate a source database to a destination site; maintaining a catalog indicating inserts and updates that take place at said destination site during replication; utilizing said catalog entries to determine which of said external files to replicate to said destination site; and utilizing a second procedure outside of said DBMS software to automatically replicate said external files to said destination site according to said catalog entries.

According to disclosed embodiments there is provided a method for selective replication of a database with associated external files to accommodate computer manufacturing with pre-installation of software, said method comprising the actions of: utilizing DBMS software to automatically replicate a source database to a destination site; maintaining a catalog of references to database entries which were inserted or updated at said destination site during replication; utilizing said catalog references to verify the contents of said destination site against stated check values contained in said source database; and utilizing a second procedure outside of said DBMS software to reference said catalog and transfer said associated external files to the destination site; whereby said destination database contains a complete mirror of said source database but only selected ones of said associated files.

According to disclosed embodiments there is provided a database structure for managing SKU/BOM relationships in a computer manufacturing environment, comprising: a first data association including a key uniquely identifying a SKU contained in said database; a second data association which includes a key associating said SKU to a third association; a third data association which includes a key uniquely identifying a BOM contained in said database and attribute data objects which describe said BOM; wherein one-to-many relationships exist between said first and second data associations; and wherein many-to-one relationships exist between said second and third associations; wherein said first, second, and third associations define software to be installed in computers in a manufacturing environment.

According to disclosed embodiments there is provided a database structure for managing SKU/BOM relationships, comprising: first, second, and/or third data associations which jointly identify SKIJs, BOMs, and attribute data objects which describe said BOM; a fourth data association which includes a key associating each said BOM to its associated files and partitions; a fifth data association which includes a key uniquely identifying one of said files associated with said BOM and attribute data objects which describe said file; and a sixth data association which includes a key uniquely identifying partitioning information associated with said BOM and attribute data objects which describe said partition; and wherein many-to-one relationships exist between said fourth and fifth associations, and between said fourth and sixth associations.

Modifications and Variations

As will be recognized by those skilled in the art., the innovative concepts described in the present application can be modified and varied over a tremendous range of applications, and accordingly the scope of patented subject matter is not limited by any of the specific exemplary teachings given.

Several database models exist which utilize different approaches to the organization of data. While the preferred embodiment is implemented in a relational database model, alternatively, the object-oriented model, network model, or another model could be used to store and organize the data.

Additionally, a particular set of tables and data has been used for the organization of data in the relational database. However, data kept in one or more tables could be divided between other tables, used to populate new tables, or condensed into fewer tables or, a greater or lesser number of data attributes can be stored. Further, different primary and/or secondary keys could be used to access the table.

The relational database model also offers data structures for the storage and organization of large files. The BLOb file approach utilized for the movement of the physical files in the preferred embodiment could be replaced by allowing the DBMS to store and organize the files utilizing its own binary data types such as BIT VARYING. BIT VARYING allows the DBMS to store large variable binary objects such as data files in table structures along with other traditional table data. However, this data structure requires a significant amount of overhead in terms of processing speed and storage space. New data structures may offer an approach which is closer in performance to the BLOb file approach utilized in the preferred embodiment.

In the preferred embodiment, distribution of database information and BLOb files takes place via LAN and WAN connections. However, the data could be distributed to local and remote facilities in many different ways such as over an intranet or the internet. Further, several different server/database configurations can be utilized. For example, a single server can maintain multiple isolated database structures and file sets.

The determination of duplicate data is made by comparing the file size and result of an MD5 hash calculation. However, other more rudimentary methods of duplicate checking can be utilized. For instance, a check incorporating file name, size, and date/time stamp can be utilized.

In the preferred embodiment, CIIT or a similar method is used to release software into the software distribution system. However, any method can be used to introduce software into the distribution system as long as it is in a manner conforming to the ERDs which describe the database. For instance, the information describing individual software files or group of files may be entered by hand into the tables of the database and the software copied to the distribution system and placed in the proper directory.

What is claimed is:

1. A method for manufacturing computers with pre-installed software, comprising the actions of:

(a.) in a first software engineering group, creating a first respective structured database containing references to software objects to be pre-installed with a structure of associations which allows duplicate files to be referenced and removed from said server, and storing said software objects on a first respective server according to database said references;

(b.) isolating said structured database and files into separate database structures and servers by:
referencing and eliminating any duplicate files existing between the isolated and structured servers; referencing and eliminating any duplicate reference existing between the isolated and structured databases; updating any references that have been modified; and creating a catalog containing said added or updated references;

(c.) repeating steps (a.)–(b.) one or more times for multiple software generating groups with separate respective structured databases and separate respective servers;

(d.) merging all said isolated structured database and associated server files into a master isolated database and master isolated server by, for each isolated structured database and associated server:
referencing and eliminating any duplicate files existing between the isolated and master servers; referencing said catalog structure to perform, update, insert and duplicate eliminating operations for each entry in said catalog, wherein a full database comparison is avoided; and updating any references that have been modified;

(e.) repeating the merging actions of step (d.) for each isolated structured database and associated server files; and (f.) manufacturing computers with said software preinstalled from said master isolated database and master isolated server; whereby each software object is stored only once in said master isolated server and each software object reference in the master database is unique.

2. The method of claim 1, wherein said software objects are stored within said structured database.

3. The method of claim 1, wherein said isolating, updating, merging, and duplicate elimination are performed by DBMS software.

4. The method of claim 1, wherein said software objects are comprised of disk images.

* * * * *